US011218798B2

(12) United States Patent
Yang et al.

(10) Patent No.: US 11,218,798 B2
(45) Date of Patent: Jan. 4, 2022

(54) ELECTRONIC DEVICE INCLUDING A DISPLAY PANEL SPEAKER

(71) Applicant: Samsung Electronics Co., Ltd., Suwon-si (KR)

(72) Inventors: Seongkwan Yang, Suwon-si (KR); Byounghee Lee, Suwon-si (KR); Taeeon Kim, Suwon-si (KR); Jihoon Song, Suwon-si (KR); Hochul Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/842,028

(22) Filed: Apr. 7, 2020

(65) Prior Publication Data

US 2020/0329304 A1    Oct. 15, 2020

(30) Foreign Application Priority Data

Apr. 9, 2019 (KR) .................. 10-2019-0041643
Mar. 3, 2020 (KR) .................. 10-2020-0026781

(51) Int. Cl.
*H04R 1/02* (2006.01)
*H04R 1/28* (2006.01)
*H04M 1/03* (2006.01)

(52) U.S. Cl.
CPC .......... *H04R 1/2811* (2013.01); *H04M 1/03* (2013.01); *H04R 1/025* (2013.01); *H04M 2201/38* (2013.01); *H04R 2499/11* (2013.01); *H04R 2499/15* (2013.01)

(58) Field of Classification Search
CPC .......... H04R 1/02; H04R 1/025; H04R 1/026

USPC .......................................................... 381/388
See application file for complete search history.

(56) References Cited

U.S. PATENT DOCUMENTS

| RE44,942 E * | 6/2014 | Lee .................. H04R 1/2857 |
| | | 455/575.1 |
| 9,525,943 B2 | 12/2016 | Donarski et al. |
| 9,802,225 B2 | 10/2017 | Houston et al. |
| 2013/0156233 A1 | 6/2013 | Joo |
| 2017/0280234 A1 | 9/2017 | Choi et al. |

(Continued)

FOREIGN PATENT DOCUMENTS

| JP | 2005-110216 A | 4/2005 |
| JP | 2009-198902 A | 9/2009 |
| KR | 10-2017-0076567 A | 7/2017 |

(Continued)

OTHER PUBLICATIONS

International Search Report dated Jul. 22, 2020, issued in International Application No. PCT/KR2020/004674.

*Primary Examiner* — Suhan Ni
(74) *Attorney, Agent, or Firm* — Jefferson IP Law, LLP

(57) ABSTRACT

A mobile communication device is provided. The mobile communication device includes a display, a supporting member disposed under the display and having a hole, and a vibration actuator attached to the supporting member, where the vibration actuator does not overlap the hole when seen substantially perpendicular to the display, and where at least a portion of a region surrounding the hole of the supporting member is vibrated by vibration generated from the vibration actuator, whereby a sound signal having a predetermined frequency to be used for voice communication is generated.

22 Claims, 20 Drawing Sheets

(56) References Cited

U.S. PATENT DOCUMENTS

2019/0037164 A1   1/2019   Kim et al.

FOREIGN PATENT DOCUMENTS

| KR | 10-2019-0029949 A | 3/2019 |
|---|---|---|
| KR | 10-1977079 B1 | 5/2019 |

* cited by examiner

ELECTRONIC DEVICE INCLUDING A DISPLAY PANEL SPEAKER

CROSS-REFERENCE TO RELATED APPLICATION(S)

This application is based on and claims priority under 35 U.S.C. § 119(a) of a Korean patent application number 10-2019-0041643, filed on Apr. 9, 2019, in the Korean Intellectual Property Office, and of a Korean patent application number 10-2020-0026781, filed on Mar. 3, 2020, in the Korean Intellectual Property Office, the disclosure of each of which is incorporated by reference herein in its entirety.

BACKGROUND

1. Field

The disclosure relates to an electronic device including a display panel speaker.

2. Description of Related Art

Recently, a Sound-On-Display (SOD) technology that can generate sounds by vibrating a display panel using a vibration actuator mounted on the display of mobile devices is popularized. The SOD technology can implement a full screen of a display panel by removing an existing speaker module including a sound emission passage.

As vibration actuators that are usually used to implement the SOD, there are a voice coil motor and a piezoelectric actuator. Such vibration actuators are attached to a component of a mobile device and use the principle in which vibration generated by the vibration actuator is changed into a sound signal while being transmitted to a panel display.

The above information is presented as background information only to assist with an understanding of the disclosure. No determination has been made, and no assertion is made, as to whether any of the above might be applicable as prior art with regard to the disclosure.

SUMMARY

An existing speaker module for making telephone calls has a limitation that it should be disposed in a transmission-reception reference region (a region where a mobile device is close to a user's ear in a telephone call). Unlikely, a display panel speaker can generate sounds even outside of a transmission reception reference region by mounting a vibration actuator on the rear side of a display. Accordingly, a display panel speaker can be more freely disposed unlike the existing speaker module for a telephone call. However, there is a problem that the farther the vibration actuator from the transmission-reception reference region, the lower the sound performance.

Aspects of the disclosure are to address at least the above-mentioned problems and/or disadvantages and to provide at least the advantages described below. Accordingly, an aspect of the disclosure is to provide an electronic device including a display panel speaker.

Additional aspects will be set forth in part in the description which follows and, in part, will be apparent from the description, or may be learned by practice of the presented embodiments.

In accordance with an aspect of the disclosure, a mobile communication device is provided. The mobile communication device includes a display, a supporting member disposed under the display and having a hole, and a vibration actuator attached to the supporting member, wherein the vibration actuator does not overlap the hole when seen substantially perpendicular to the display, and wherein at least a portion of a region surrounding the hole of the supporting member is vibrated by vibration generated from the vibration actuator, whereby a sound signal having a predetermined frequency to be used for voice communication is generated.

In accordance with another aspect of the disclosure, an electronic device is provided. The electronic device includes a housing having a first surface facing a first direction, a second surface facing a second direction opposite to the first direction, and a side defining an internal space by extending along edges of the first surface and the second surface, a supporting member extending from a side of the housing, disposed in the internal space, and having a first region at least partially cut off, a display disposed on the supporting member, and a vibration actuator disposed between the display and the second surface and disposed within a predetermined distance from the first region, in which a portion having the first region of the supporting member is at least partially vibrated by vibration generated from the vibration actuator, whereby a sound signal having a predetermined frequency to be used for voice communication is generated.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
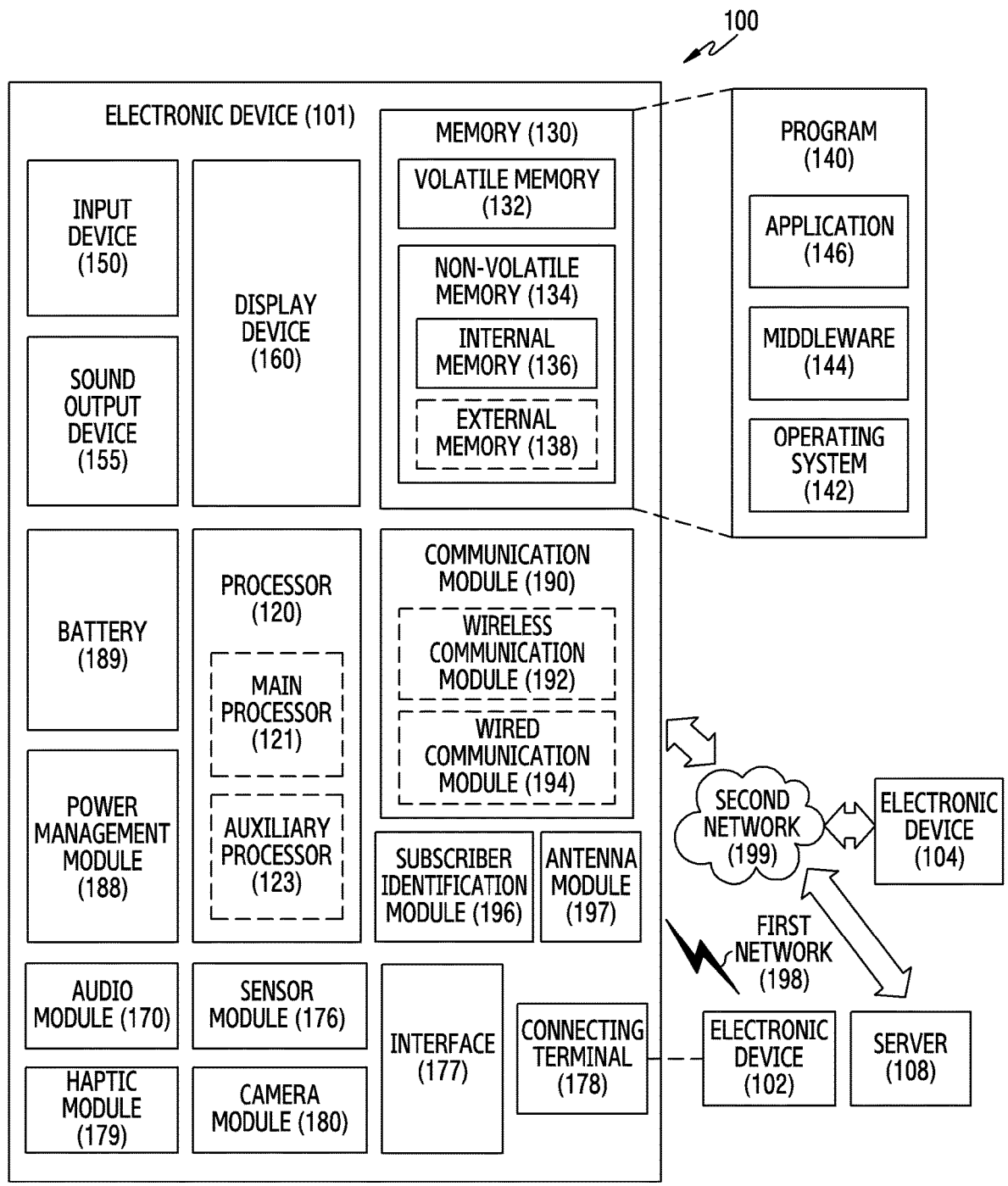
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment of the disclosure, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture an image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment of the disclosure, the antenna module 197 may include an antenna including a radiating element composed of a conductive material or a conductive pattern formed in or on a substrate (e.g., PCB). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2A:
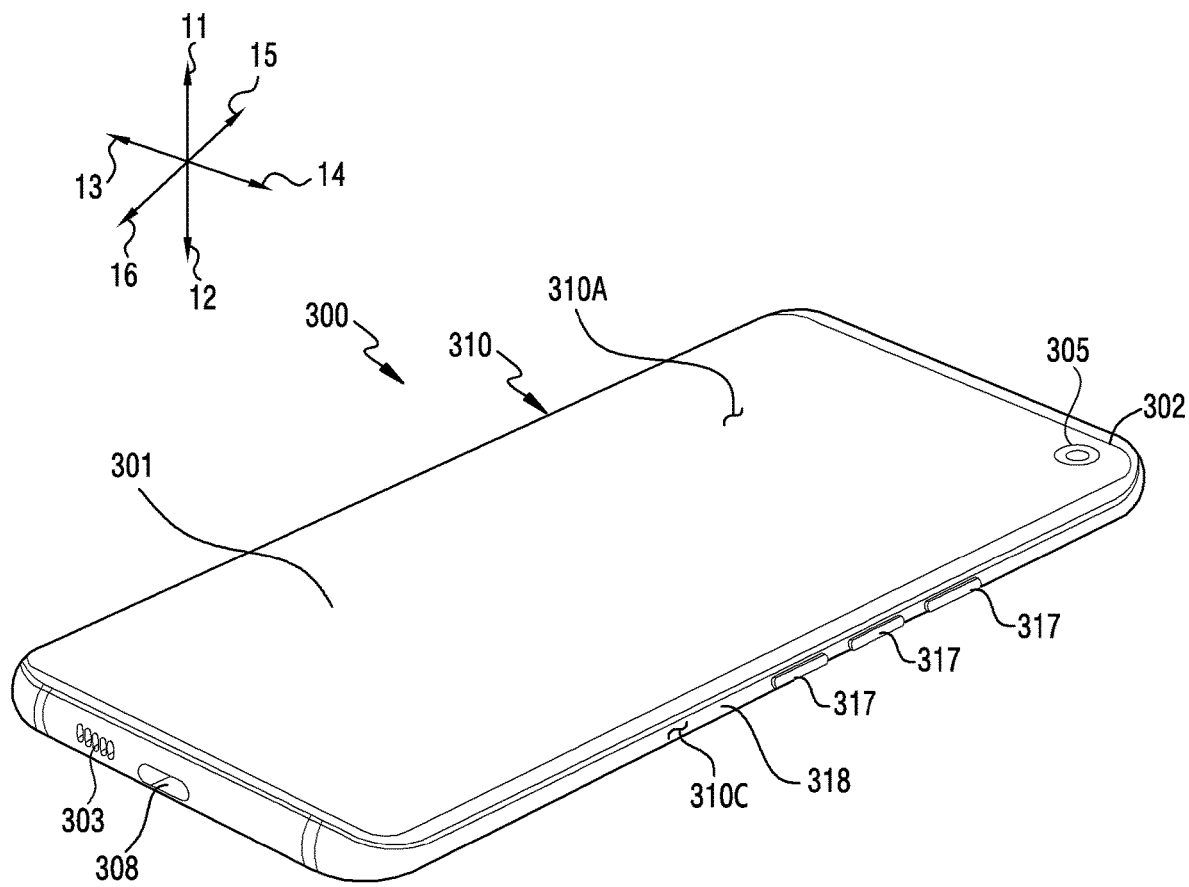
FIG. 2A is a perspective view illustrating an electronic device according to an embodiment of the disclosure.
Figure 2B:
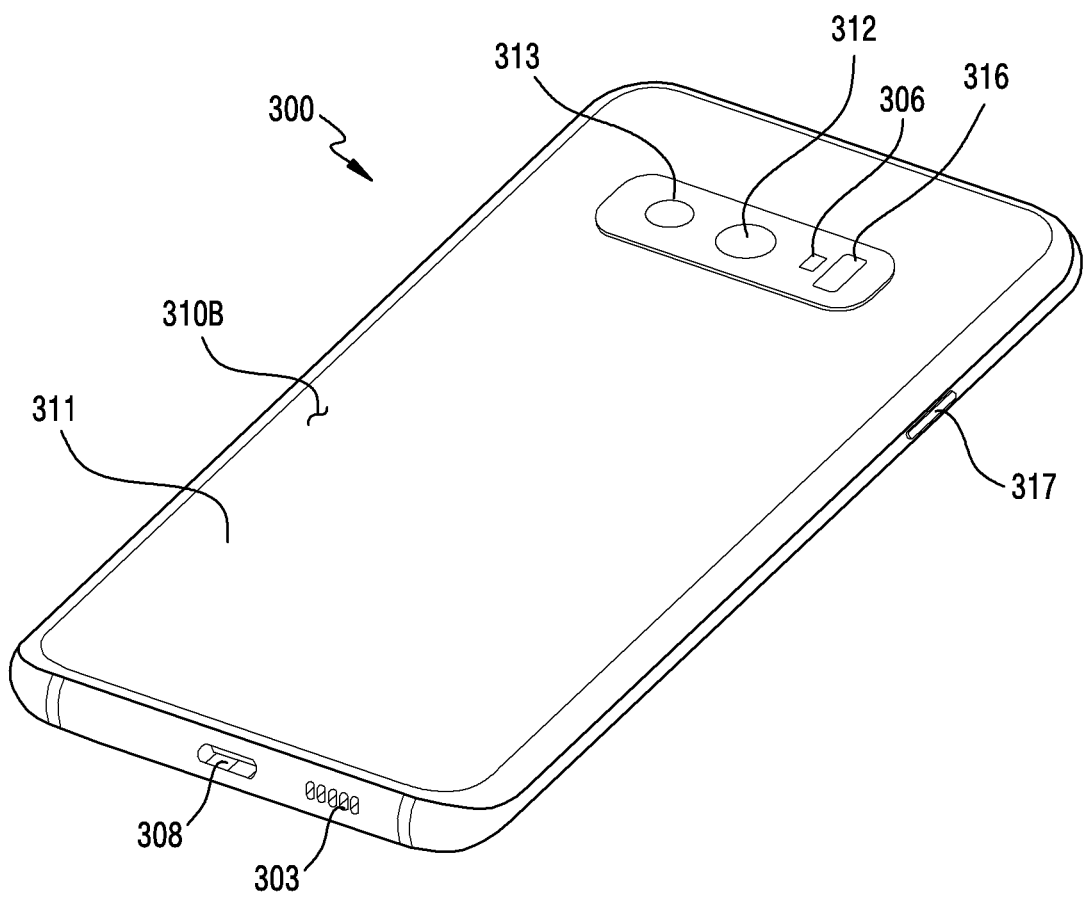
FIG. 2B is a perspective view of an electronic device of FIG. 2A seen from a rear according to various embodiments of the disclosure.

FIG. 2A is a perspective view illustrating an electronic device of the disclosure. FIG. 2B is a perspective view of an electronic device seen from a rear according to an embodiment of the disclosure.

Referring to FIGS. 2A and 2B, an electronic device 300 according to an embodiments may include a housing 310 having a first surface (or a front surface) 310A, a second surface (or a rear surface) 310B, and a side (or a side wall)

310C surrounding the space between the first surface 310A and the second surface 310B. In another embodiment (not shown), the housing may mean a structure forming some of the first surface 310A, the second surface 310B, and the side 310C shown in FIGS. 2A and 2B.

According to an embodiment of the disclosure, the first surface 310A may be at least partially substantially formed by a transparent front plate 302 (e.g., a glass plate or a polymer plate including various coating layers). Depending on embodiments of the disclosure, the front plate 302 may have a curved portion bending and seamlessly extending from the first surface 310A to a rear plate 311 at least a side edge portion.

According to an embodiment of the disclosure, the second surface 310B may be formed by the rear plate 311 that is substantially opaque. The rear plate 311, for example, may be made of coated or colored glass, ceramic, a polymer, metal (e.g., aluminum, stainless steel (STS), or magnesium), or a combination of at least two of these materials. Depending on embodiments of the disclosure, the rear plate 302 may have a curved portion bending and seamlessly extending from the second surface 310B to the front plate 302 at at least a side edge portion.

According to an embodiment of the disclosure, the side 310C is combined with a front plate 302 and a rear plate 311 and may be formed by a lateral bezel structure 318 (or a "lateral member or a side wall") including metal and/or a polymer. In an embodiment of the disclosure, the rear plate 311 and the lateral bezel structure 318 may be integrated and may include the same material (e.g., a metallic material, such as aluminum).

According to an embodiment of the disclosure, the electronic device 300 may include at least one or more of a display 301, an audio module 303, a sensor module, a camera module 305, key input devices 317, and a connector hole 308. In an embodiment of the disclosure, the electronic device 300 may not include at least one (e.g., the key input devices 317) of the components or may further include other components. For example, the electronic device 300 may include a sensor module not shown. For example, a sensor, such as a proximity sensor or an illumination sensor may be integrated with a display 301 or may be disposed adjacent to the display 301 in a region that is provided by the front plate 302. In an embodiment of the disclosure, the electronic device 300 may further include a light emitting element and the light emitting element may be disposed adjacent to the display 301 in the region that is provided by the front plate 302. The light emitting element, for example, may provide state information of the electronic device 300 in a light type. In another embodiment of the disclosure, the light emitting element, for example, may provide a light source that operates with the operation of a camera module 305. The light emitting element, for example, may include an LED, an IR LED, and a xenon lamp.

The display 301, for example, may be viewable through a large part of the front plate 302. In an embodiment of the disclosure, the corners of the display 301 may be formed in substantially the same shape as the adjacent outline shape (e.g., curved portion) of the front plate 302. In another embodiment (not shown), in order to enlarge the viewed region of the display 301, the gap between the outline of the display 301 and the outline of the front plate 302 may be substantially uniform. In another embodiment (not shown), a recess or an opening may be formed in a portion of a display region of the display 301, and other electronic parts aligned with the recess or the opening, such as the camera module 305 and a proximity sensor or an illumination sensor (not shown) may be included.

In another embodiment (not shown), at least one or more of a camera module 312, 313, a fingerprint sensor 316, and a flash 306 may be disposed on the rear surface of the display region of the display 301. In an embodiment of the disclosure, the display 301 may be combined with or disposed adjacent to a touch detection circuit, a pressure sensor that can measure the intensity (pressure) of a touch, and/or a digitizer that detects a magnetic stylus pen.

The audio module 303 may have a microphone hole or a speaker hole. A microphone for catching external sounds may be disposed in the microphone hole, and in an embodiment of the disclosure, a plurality of microphones may be disposed therein to be able to detect the direction of sounds. In an embodiment of the disclosure, the speaker hole and the microphone hole may be implemented as one hole or a speaker may be included without the speaker hole (e.g., a piezo speaker). The electronic device 300 includes the sensor module (not shown), thereby being able to generate an electrical signal or a data value that corresponds to an internal operation state or an external environment state. The sensor module, for example, may further include a proximity sensor disposed on the first surface 310A of the housing 310, a fingerprint sensor integrated with or disposed adjacent to the display 301, and/or a biosensor (e.g., HRM sensor) disposed on the second surface 310B of the housing 310. The electronic device 300 may further include a sensor module (not shown), for example, at least one of a gesture sensor, a gyro sensor, a barometer sensor, a magnetic sensor, an acceleration sensor, a grip sensor, a color sensor, an IR (Infrared) sensor, a biosensor, a temperature sensor, a humidity sensor, or an illumination sensor.

The camera module 305, 312, 313, 306 may include a first camera device 305 disposed on the first surface 310A of the electronic device 300, and second camera devices 312 and 313 and/or a flash 306 disposed on the second surface 310B. The camera devices 305, 312, and 313 may include one or more lenses, an image sensor, and/or an image signal processor. A flash 306, for example, may include a light emitting diode or a xenon lamp. In an embodiment of the disclosure, two or more lenses (an infrared camera, a wide-angle lens, and a telephoto lens) and image sensors may be disposed on one surface of the electronic device 300.

The key input devices 317 may be disposed on the side 310C of the housing 310. In an embodiment of the disclosure, the electronic device 300 may not include some or all of the key input devices 317 described above and the unincluded key input devices 317 may be implemented in other types, such as software keys on the display 301. In an embodiment of the disclosure, the key input devices may include at least a portion of the fingerprint sensor 316 disposed on the second surface 310B of the housing.

The connector hole 308 can accommodate a connector for transmitting and receiving power and/or data to and from an external electronic device, and/or a connector for transmitting and receiving an audio signal to and from an external electronic device. For example, the connector hole 308 may include a USB connector or an earphone jack.

Figure 3:
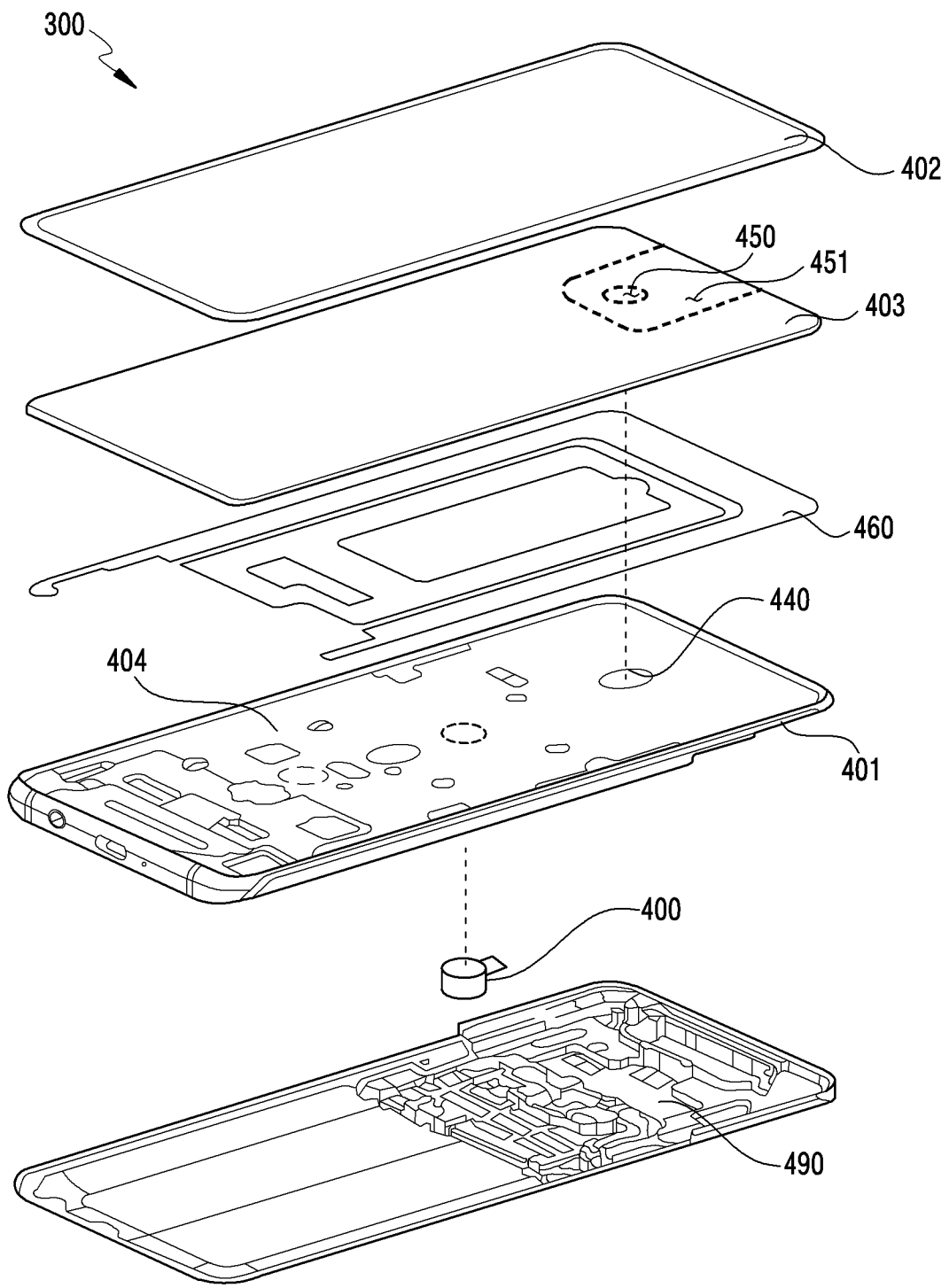
FIG. 3 is an exploded perspective view of an electronic device according to an embodiment of the disclosure.

FIG. 3 is an exploded perspective view of an electronic device according to an embodiment of the disclosure.

Referring to FIG. 3, the electronic device 300 may include a housing 401 (e.g., the housing 310 of FIG. 2A), a transparent plate 402 (e.g., the front plate 302 of FIG. 2A), a rear plate 490 (e.g., a rear plate 311 of FIG. 2B), a supporting member 404, a display 403 (e.g., the display 301 of FIG. 2A), and a vibration actuator 400.

According to an embodiment of the disclosure, the housing 401 may have a first surface (e.g., the front surface 310A of FIG. 2A) of the electronic device 300, a second surface (e.g., the rear surface 310B of FIG. 2B) of the electronic device 300, and a side (e.g., the side 310C of FIG. 2A) extending along the edges of the first surface and the second surface and surrounding the internal space of the electronic device 300.

According to an embodiment of the disclosure, the transparent plate 402 may form the first surface of the electronic device 300. The edge of the transparent plate 402 may be connected to the side wall of the housing 401 in contact with a portion of the side wall of the housing 401. The transparent plate 402 may be made of a transparent polymer (e.g., polyimide (PI) or polyethylene terephthalate (PET) or glass.

According to an embodiment of the disclosure, the rear plate 490 may form the second surface of the electronic device 300. The edge of the rear plate 490 may be connected to the side wall of the housing 401 in contact with a portion of the side wall of the housing 401.

According to an embodiment of the disclosure, the display 403 may be disposed between the transparent plate 402 and the supporting member 404. The display 403 may be composed of a plurality of layers. For example, the display 403 may include a thin film transistor (TFR) layer, an electrode layer, an organic layer, or a pixel layer. The display 403 may be shown to the outside through the transparent plate 402. The display 403 can emit light for transmitting information to a user from a pixel and the emitted light can be transmitted to the outside through the transparent plate 402. The display 403 may include a display panel (not shown) or a touch panel (not shown). The touch panel may be disposed on the pixel layer (or in the pixel layer) of the display panel. According to an embodiment of the disclosure, the display 403 may be combined with or disposed adjacent to some of a touch detection circuit connected to the touch panel to detect a touch, a pressure sensor that can measure the intensity (pressure) of a touch, or a digitizer that detects a magnetic stylus pen.

In an embodiment of the disclosure, the supporting member 404 may include at least one component for supporting the display 403. For example, the supporting member 404 may include at least one of an embossed layer disposed under the display 403, a cushion layer disposed under the embossed layer, a conductive layer disposed under the cushion layer, a resin layer disposed under the display 403, a graphite layer disposed under the display 403, and/or a bracket disposed under the display 403. The embossed layer may have an embossed pattern having a plurality of projections and a plurality of recessions formed by the plurality of projections. The embossed layer may include an adhesive layer. The embossed layer can prevent foreign substances, such as water or dust from entering the display 403. The cushion layer can improve the durability of the display 403 by attenuating impact that may be applied to the display 403. The cushion layer may include a sponge. The conductive layer can block electromagnetic waves so that other parts are not influenced by electromagnetic waves generated from the display 403 or the display 403 is not influenced by electromagnetic waves generated from other parts. The conductive layer may include metal, for example, copper. The resin layer (e.g., polyethylene terephthalate (PET)) can improve the durability of the display 403 by attenuating impact that may be applied to the display 403. The graphite layer can operate as a heat dissipation member that dissipates heat transferring from the display 403. The bracket can support the display 403. The bracket can support at least one of the embossed layer, the cushion layer, the conductive layer, the resin layer, and/or the graphite layer disposed under the display 403. The bracket may be integrated with the housing 401 forming the side 310C of the electronic device 300 or may be individually formed. The bracket may include metal and/or a polymer.

According to an embodiment of the disclosure, the supporting member 404 may extend into the internal space of the electronic device 300 from the side of the housing 401. The supporting member 404 can support electronic parts (e.g., a camera, a printed circuit board, or a vibration actuator 400) disposed in the electronic device 300. The supporting member 404 may be integrated with the side of the housing 401 or may be separated from the side of the housing 401 and disposed in the housing 401. According to an embodiment of the disclosure, the supporting member 404 may be at least partially in contact with the transparent plate 402 and can support the transparent plate 402. According to an embodiment of the disclosure, the supporting member 404 may be formed to surround the display 403. The supporting member 404 may be spaced apart from the display 403, so a gap 406 may be defined between the supporting member 404 and the display 403. The electronic device 300 may further include a spacer 460 (e.g., an adhesive or a double-sided tape) to maintain the gap 406 between the supporting member 404 and the display 403. In an embodiment of the disclosure, when at least a portion of the supporting member 404 is in contact with the display 403, the spacer 460 may be partially removed or entirely omitted.

According to an embodiment of the disclosure, the supporting member 404 may have a first region 440. The first region 440 may be a region where the stiffness of the supporting member 404 is adjusted. The first region 440 may have a hole formed through the supporting member 404 (e.g., the first opening 410 of FIG. 4A) or a groove formed in a surface of the supporting member 404 (e.g., a groove 409 of FIG. 4C). For example, a vibration characteristic of the supporting member 404 may be adjusted through the groove or the opening formed in the first region 440.

According to an embodiment of the disclosure, the vibration actuator 400 may be disposed between the supporting member 404 and the rear plate 490. The vibration actuator 400 may be disposed within a predetermined distance from the first region 440. The vibration actuator 400 may be attached to the supporting member 404 by an adhesive member (not shown) (e.g., an adhesive member 405 of FIG. 4A). The adhesive member, for example, may include a double-sided adhesive film and a pressure sensitive adhesive (PSA). According to an embodiment of the disclosure, the vibration actuator 400 can convert an electrical signal into a mechanical signal. For example, the vibration actuator 400 can generate vibration in response to an electrical signal including sound information. Vibration generated by the vibration actuator 400 is transmitted to an element (e.g., the supporting member 404, the display 403, or the transparent plate 402) of the electronic device 300, thereby being able to generate a sound signal. For example, the vibration generated by the vibration actuator 400 can be transmitted to the display 403. The display 403 may operate as a diaphragm of a speaker. The vibration generated by the vibration actuator 400 is transmitted to the display 403, thereby being able to generate a sound. According to an embodiment of the disclosure, the vibration actuator 400 may include a voice coil motor or a piezoelectric actuator. The electronic device 300 may include a plurality of vibration actuators 400.

The electronic device 300 according to an embodiment may include a printed circuit board (not shown) disposed between the supporting member 404 and the rear plate 490 and the vibration actuator 400 may be disposed between the supporting member 404 and the printed circuit board. The printed circuit board may have an opening corresponding to the position of the vibration actuator 400 and the vibration actuator 400 may be partially accommodated in the opening. The opening of the printed circuit board may not be formed, depending on the height of the vibration actuator 400.

In an embodiment of the disclosure, the vibration actuator 400 may be electrically connected with the printed circuit board through various connection parts. For example, the vibration actuator 400 may be electrically connected with the printed circuit board through a flexible PCB and may be electrically connected with other components (e.g., the processor 120) of the electronic device 300.

According to an embodiment of the disclosure, the electronic device 300 may be manufactured with the stiffness of an element adjusted in order to optimize the vibration characteristic of the element. For example, the supporting member 404 may have a first region 440. The first region 440 defined in the supporting member 404 may have a hole formed through the supporting member 404 or a groove formed in a surface of the supporting member 404. The first region 440 may be defined in various shapes. For example, the first region 440 may be defined as a circle, a rectangle, or a rectangle with rounded corners. According to an embodiment of the disclosure, the first region 440 may be spaced apart from the vibration actuator 400 and may be defined within a predetermined distance range defined in FIG. 8 to be described below. According to an embodiment of the disclosure, at least a portion of an electronic part (e.g., the electronic part 411 of FIG. 4B) may be inserted in the opening or the hole included in the first region 440.

According to an embodiment of the disclosure, the display 403 may have a sound adjustment region 451. The sound adjustment region 451 may be a region in which the characteristic (e.g., sound pressure, frequency response characteristic, frequency flatness) of a sound transmitted through the display 403 is improved. The sound adjustment region 451 may include a region 450 and the region 450 may be a region corresponding to the position of the first region 440. According to an embodiment of the disclosure, a through-hole formed through the display 403 (e.g., a second opening 420 of FIG. 5A) may be formed in the region 450 of the sound adjustment region 451. The characteristic of a sound that is transmitted through the sound adjustment region 451 can be improved by the through-hole formed in the region 450, the through-hole formed in the first region 440 (e.g., the first opening 410 of FIG. 4A), or the groove formed in the first region 440 (e.g., the groove 409 of FIG. 4C). According to an embodiment of the disclosure, the position and the size of the sound adjustment region 451 are not limited to the shown example and may be variously changed. For example, the position of the sound adjustment region 451 may depend on the position of the region 450. As another example, the sound adjustment region 451 may include a region to which the body (e.g., an ear) of a user comes close when the user makes a telephone call and may be appropriately determined in accordance with the shape and size of the electronic device. Since the sound that is output using the vibration actuator 400 is not limited to a telephone call sound (e.g., playback of a multimedia including audio), the sound adjustment region 451 may be defined wider than that shown in FIG. 3 (e.g., a sound adjustment region 603 of FIG. 11). The sound pressure of a sound that is generated by vibration generated by the vibration actuator 400 in the display 403 may be largest in the sound adjustment region 451.

Figure 4A:
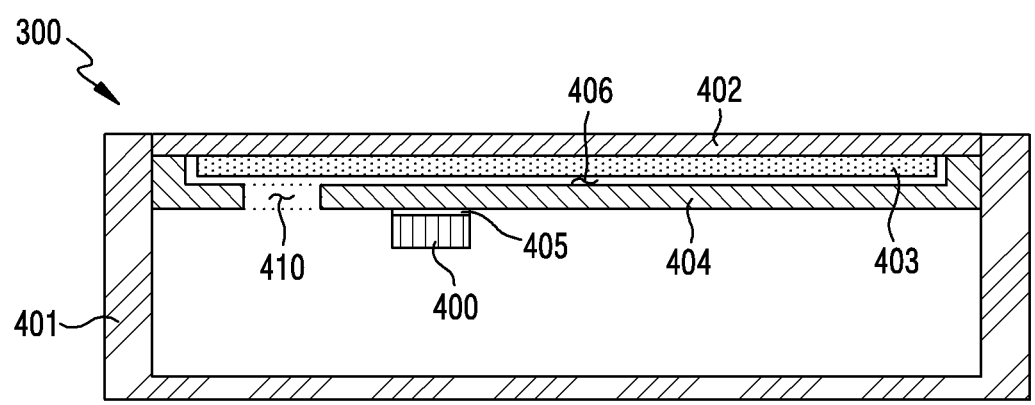
FIG. 4A is a cross-sectional view of an electronic device according to an embodiment of the disclosure.
Figure 4B:
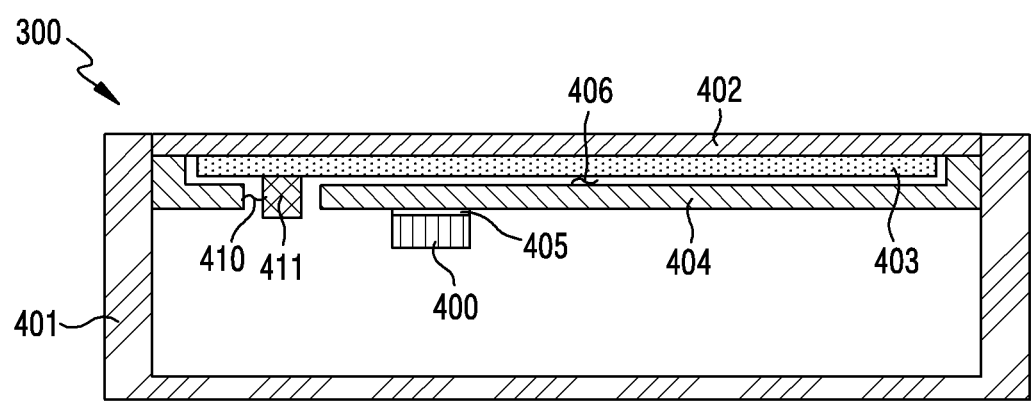
FIG. 4B is a cross-sectional view of an electronic device according to an embodiment of the disclosure.
Figure 4C:
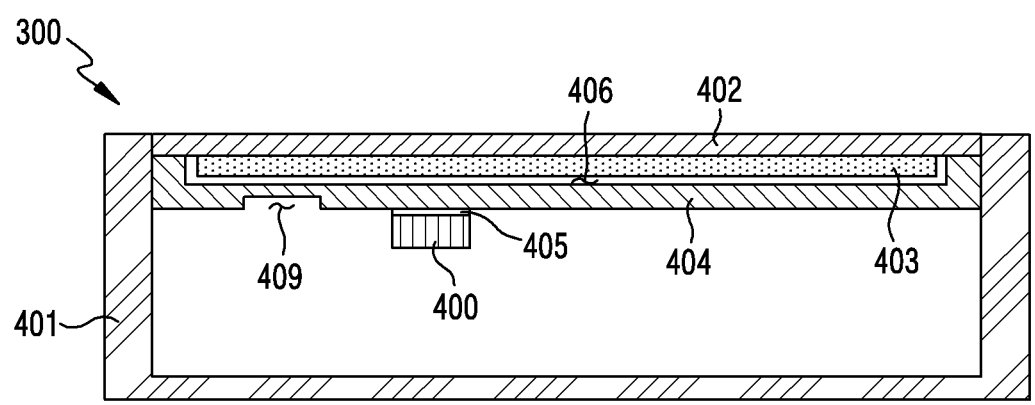
FIG. 4C is a cross-sectional view of an electronic device according to an embodiment of the disclosure.

FIG. 4A is a cross-sectional view of an electronic device according to an embodiment of the disclosure, FIG. 4B is a cross-sectional view of an electronic device according to an embodiment of the disclosure, and FIG. 4C is a cross-sectional view of an electronic device according to an embodiment of the disclosure.

Referring to FIGS. 4A, 4B, and 4C, the electronic device 300 may include a housing 401, a transparent plate 402, a supporting member 404, a display 403, a vibration actuator 400, and an electronic part 411.

According to an embodiment of the disclosure, the housing 401 may have a first surface (e.g., the front surface 310A of FIG. 2A) of the electronic device 300, a second surface (e.g., the rear surface 310B of FIG. 2B) of the electronic device 300, and a side (e.g., the side 310C of FIG. 2A) extending along the edges of the first surface and the second surface and surrounding the internal space of the electronic device 300.

According to an embodiment of the disclosure, the transparent plate 402 may form the first surface of the electronic device 300. The edge of the transparent plate 402 may be connected to the side wall in contact with a portion of the side wall of the housing 401.

According to an embodiment of the disclosure, the supporting member 404 may extend into the internal space of the electronic device 300 from the side of the housing 401. The supporting member 404 can support electronic parts (e.g., a camera, a printed circuit board, or a vibration actuator 400) disposed in the electronic device 300. According to an embodiment of the disclosure, at least a portion of the supporting member 404 may be in contact with the transparent plate 402 and the supporting member 404 can support the transparent plate 402. In an embodiment of the disclosure, the supporting member 404 may be formed to surround the display 403. The supporting member 404 may be spaced apart from the display 403, whereby a gap 406 may be defined. The electronic device 300 may further include a spacer (e.g., the spacer 460 of FIG. 3, for example, an adhesive or a double-sided tape) to maintain the gap 406 between the supporting member 404 and the display 403. In an embodiment of the disclosure, at least a portion of the supporting member 404 may be in contact with the display 403. When at least a portion of the supporting member 404 is in contact with the display 403, the spacer may be partially removed or entirely omitted. According to an embodiment of the disclosure, the supporting member 404 may have a first opening 410 formed through the supporting member 404 in a region.

According to an embodiment of the disclosure, the display 403 may be disposed between the transparent plate 402 and the supporting member 404.

According to an embodiment of the disclosure, the vibration actuator 400 may be disposed between the display 403 and the second surface of the housing 401. The vibration actuator 400 may be disposed within a predetermined distance from the first opening 410. For example, the vibration actuator 400 may be spaced apart from the first opening 410, and may not overlap the first opening 410 when seen from above the display (or when the electronic device 300 is seen in a direction substantially perpendicular to the display 403). The supporting member 404 may be disposed between the vibration actuator 400 and the display 403. The vibration actuator 400 may be attached to the supporting member 404 by an adhesive member 405. The adhesive member 405, for example, may include a double-sided adhesive film and a pressure sensitive adhesive (PSA). According to an embodiment of the disclosure, the vibration actuator 400 can convert an electrical signal into a mechanical signal. For example, the vibration actuator 400 can generate vibration in response to an electrical signal including sound information. The vibration generated by the vibration actuator 400 is transmitted to an element (e.g., the supporting member 404, the display 403, or the transparent plate 402) of the electronic device 300, thereby being able to generate a sound signal. For example, the vibration generated by the vibration actuator 400 can be transmitted to the display 403. The display 403 may operate as a diaphragm of a speaker. The vibration generated by the vibration actuator 400 is transmitted to the display 403, thereby being able to generate a sound. According to an embodiment of the disclosure, the vibration actuator 400 may include a voice coil motor or a piezoelectric actuator. The electronic device 300 may include a plurality of vibration actuators 400.

According to an embodiment of the disclosure, the electronic device 300 may be manufactured with the stiffness of an element adjusted in order to optimize the vibration characteristic of the element. In order to adjust the stiffness of an element, the supporting member 404 may have a first region (e.g., the first region 440 of FIG. 3). The supporting member 404 may have an opening or a groove in the first region. Referring to FIG. 4A, the supporting member 404 may have a first opening 410 formed through the supporting member 404 in a region. The first opening 410 may be defined in various shapes. For example, the first opening 410 may be defined as a circle, a rectangle, or a rectangle with rounded corners. Referring to FIG. 4C, the supporting member 404 may have a groove 409 of which the thickness decreases in a region by partially adjusting the thickness of the supporting member 404. The groove 409 or the first opening 410 may overlap a sound adjustment region (e.g., the sound adjustment region 451 of FIG. 3) of the display 403. The sound pressure of a sound that is generated by the vibration actuator 400 may be largest in the sound adjustment region of the display 403.

In the electronic device 300 (or a mobile communication device 300) according to an embodiment of the disclosure, at least a portion of the region surrounding the first opening 410 (or the groove 409) of the supporting member 404 is vibrated by vibration generated from the vibration actuator 400, whereby a sound signal having a predetermined frequency (e.g., a sound signal having a predetermined frequency to be used for voice communication) can be generated. The predetermined frequency may be, for example, about 4.5 kHz to 8 kHz, but is not limited thereto.

Referring to FIG. 4B, the electronic device 300 may include an electronic part 411.

According to an embodiment of the disclosure, the electronic part 411 may be disposed in the first region of the supporting member 404. For example, the electronic device 411 may be inserted in the first opening 410 formed in the supporting member 404. The stiffness of an element may be adjusted and the vibration characteristic transmitted from the vibration actuator 400 may be adjusted by the first opening 410. The vibration characteristic transmitted from the vibration actuator 400 may be adjusted by inserting the electronic part 411 into the first opening 410. According to an embodiment of the disclosure, at least a portion of the electronic part 411 may be inserted in the first opening 410. The electronic part 411 may be disposed in contact with the display 403. For example, the electronic part 411 may be disposed in the internal space of the housing 401 or may be attached to a surface of the display 403. According to an embodiment of the disclosure, the electronic part 411 may include at least one of an optical input/output device or a sensor module. For example, the electronic device 411 may be a camera, a proximity sensor, an illumination sensor, or a fingerprint sensor disposed under the display.

The electronic part 411 may be formed to correspond to the shape of the first opening 410. At least a portion of the electronic part 411 may be in contact with the supporting member 404 forming the circumference of the first opening 410. According to an embodiment of the disclosure, the first opening 410 in which the electronic part 411 is inserted may overlap a sound adjustment region (e.g., the sound adjustment region 451 of FIG. 3) of the display 403. The sound adjustment region of the display 403 may be a region in which the sound pressure of a sound generated by the vibration actuator 400 is the greatest.

Figure 5A:
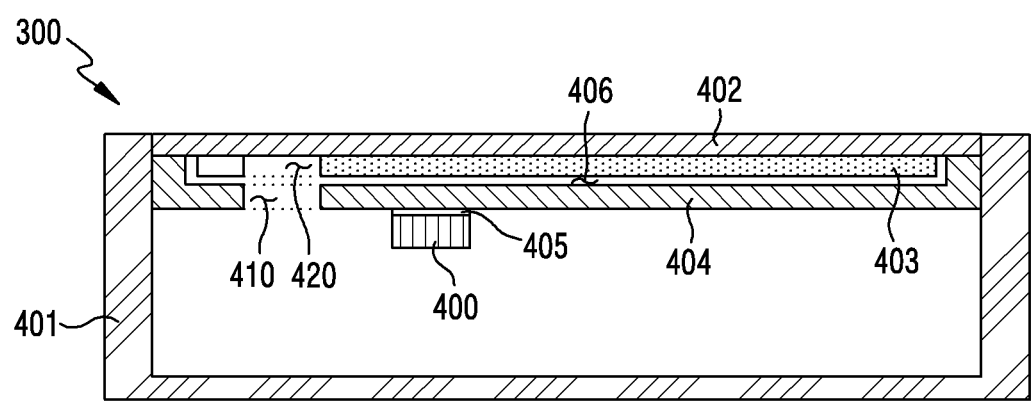
FIG. 5A is a cross-sectional view of an electronic device according to an embodiment of the disclosure.
Figure 5B:
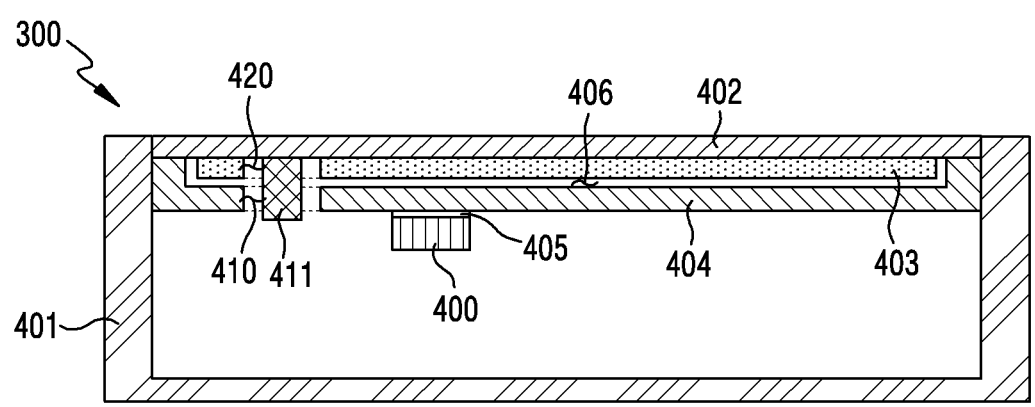
FIG. 5B is a cross-sectional view of an electronic device according to an embodiment of the disclosure.

FIG. 5A is a cross-sectional view of an electronic device according to an embodiment of the disclosure and FIG. 5B is a cross-sectional view of an electronic device according to an embodiment of the disclosure.

Referring to FIGS. 5A and 5B, the electronic device 300 may include a housing 401, a transparent plate 402, a supporting member 404, a display 403, a vibration actuator 400, and an electronic part 411.

According to an embodiment of the disclosure, the housing 401 may have a first surface (e.g., the front surface 310A of FIG. 2A) of the electronic device 300, a second surface (e.g., the rear surface 310B of FIG. 2B) of the electronic device, and a side (e.g., the side 310C of FIG. 2A) extending along the edges of the first surface and the second surface and surrounding the internal space of the electronic device 300. Other elements (e.g., the display 403 and the supporting member 404) may be disposed in the housing 401.

According to an embodiment of the disclosure, the transparent plate 402 may form a surface of the electronic device 300. The edge of the transparent plate 402 may be connected to the side wall in contact with a portion of the side wall of the housing 401.

According to an embodiment of the disclosure, the supporting member 404 may extend from the housing 401 and may be disposed in the internal space of the housing 401. The supporting member 404 can support electronic parts (e.g., a camera, a printed circuit board, or a vibration actuator 400) disposed in the electronic device 300. According to an embodiment of the disclosure, the supporting member 404 may be at least partially in contact with the transparent plate 402 and can support the transparent plate 402. The supporting member 404 may be formed to surround the display 403. The supporting member 404 may be spaced apart from the display 403, whereby a gap 406 may be defined. According to an embodiment of the disclosure, the supporting member 404 may have a first opening 410.

According to an embodiment of the disclosure, the display 403 may be disposed between the transparent plate 402 and the supporting member 404. The display 403 may have a second opening 420 formed in a region.

According to an embodiment of the disclosure, the vibration actuator 400 may be disposed within a predetermined distance from the first opening 410 formed in the supporting member 404. The supporting member 404 may be disposed between the vibration actuator 400 and the display 403. The vibration actuator 400 may be attached to the supporting member 404 by an adhesive member 405. The region in which the vibration actuator 400 is in contact with the supporting member 404 or the adhesive member 405 may be a seat space (e.g., a seat space 430 of FIG. 6B) for seating the vibration actuator 400. According to an embodiment of the disclosure, the vibration actuator 400 can generate vibration in response to an electrical signal including sound information. The vibration generated by the vibration actuator 400 is transmitted to an element (e.g., the supporting member 404, the display 403, or the transparent plate 402) of the electronic device 300, thereby being able to generate a sound signal. For example, the vibration generated by the vibration actuator 400 can be transmitted to the display 403. The display 403 may operate as a diaphragm of a speaker. The vibration generated by the vibration actuator 400 is transmitted to the display 403, thereby being able to generate a sound. The electronic device 300 may include a plurality of vibration actuators 400.

According to an embodiment of the disclosure, the electronic device 300 may be manufactured with the stiffness of an element adjusted in order to optimize the vibration characteristic of the element. In order to adjust the stiffness of an element, the electronic device 300 may have a first region formed in the element (e.g., the first region 440 of FIG. 3). The first region may have a hole formed through an element. Referring to FIG. 5A, the supporting member 404 may have a first opening 410 formed through the supporting member 404 in a region. The display 403 may have a second opening 420 formed through the display 403 in a region. The first opening 410 and the second opening 420 may be defined in various shapes. For example, the first opening 410 and the second opening 420 may be defined as a circle, a rectangle, or a rectangle with rounded corners. According to an embodiment of the disclosure, the second opening 420 may at least partially overlap the first opening 410. The shapes of the first opening 410 and the second opening 420 may be different.

According to an embodiment of the disclosure, a region corresponding to the position of the first opening 410 (the region 450 of FIG. 3) and the second opening 420 may be included in a sound adjustment region of the display 403 (e.g., the sound adjustment region 451 of FIG. 3). The sound adjustment region of the display 403 may be a region in which the sound pressure of a sound generated by the vibration actuator 400 is the greatest.

Referring to FIG. 5B, the electronic device 300 may include an electronic part 411.

According to an embodiment of the disclosure, the electronic part 411 may be disposed in a region of which the stiffness has been adjusted on the supporting member 404. For example, the electronic device 411 may be inserted in the first opening 410 or the second opening 420 formed in the supporting member 404. The first opening 410 or the second opening 420 can adjust the stiffness of an element and can adjust the vibration characteristic transmitted from the vibration actuator 400. The vibration characteristic transmitted from the vibration actuator 400 may be adjusted by inserting the electronic part 411 into the first opening 410 or the second opening 420. According to an embodiment of the disclosure, at least a portion of the electronic part 411 may be inserted in the first opening 410 or the second opening 420. For example, the electronic part 411 may be disposed in the internal space of the housing 401 or may be attached to a surface of the transparent plate 402. The electronic part 411 may be formed to correspond to the shape of the first opening 410 or the second opening 420. At least a portion of the electronic part 411 may be in contact with the supporting member 404 forming the circumference of the first opening 410 or the display 403 forming the circumference of the second opening 420. According to an embodiment of the disclosure, the electronic part 411 may include at least one of an optical input/output device or a sensor module. For example, the electronic device 411 may be a camera, a proximity sensor, or an illumination sensor disposed under display. As another example, the electronic device 411 may be an image detection module, a camera, a proximity sensor, or an illumination sensor. According to an embodiment of the disclosure, a region corresponding to the position of the first opening 410 (the region 450 of FIG. 3) and the second opening 420 may be included in a sound adjustment region of the display 403 (e.g., the sound adjustment region 451 of FIG. 3). The sound adjustment region of the display 403 may be a region in which the sound pressure of a sound generated by the vibration actuator 400 is the greatest in the display 403.

Figure 6A:
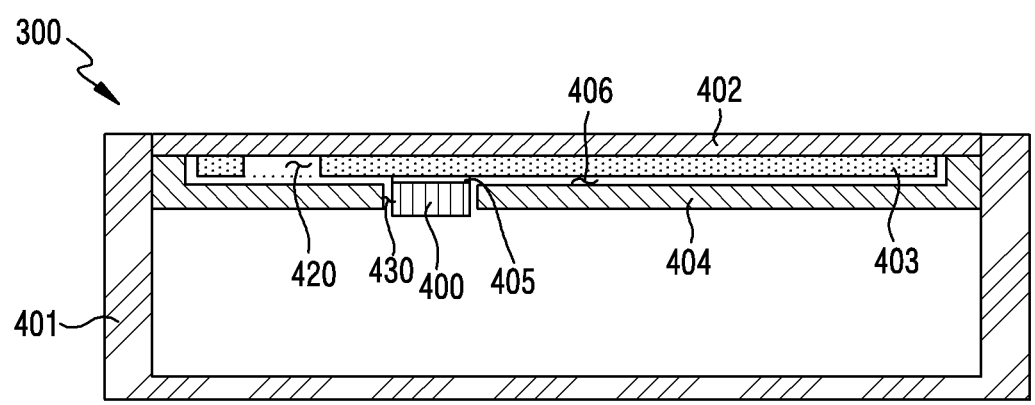
FIG. 6A is a cross-sectional view of an electronic device according to an embodiment of the disclosure.
Figure 6B:
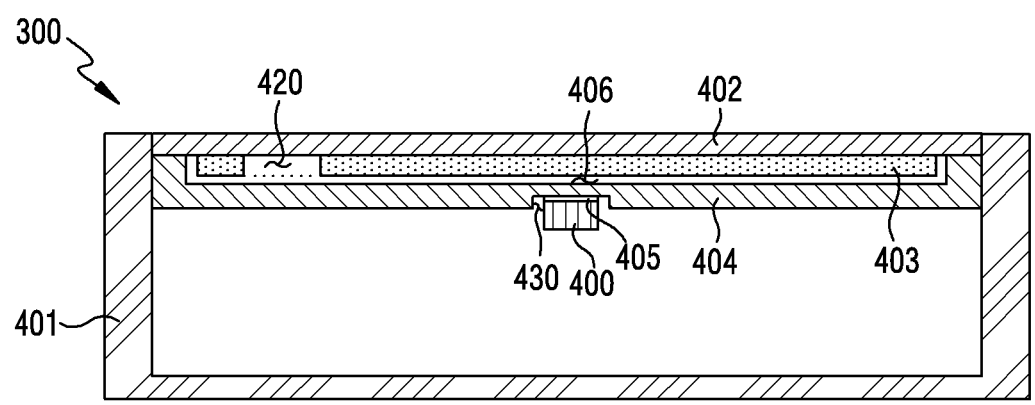
FIG. 6B is a cross-sectional view of an electronic device according to an embodiment of the disclosure.

FIG. 6A is a cross-sectional view of an electronic device according to an embodiment of the disclosure and FIG. 6B is a cross-sectional view of an electronic device according to an embodiment of the disclosure.

Referring to FIGS. 6A and 6B, the electronic device 300 may include a housing 401, a transparent plate 402, a display 403, a supporting member 404, and a vibration actuator 400.

According to an embodiment of the disclosure, the housing 401 (e.g., the housing 310 of FIG. 2A) may have a first surface (e.g., the front surface 310A of FIG. 2A) of the electronic device 300, a second surface (e.g., the rear surface 310B of FIG. 2B) of the electronic device 300, and a side (e.g., the side 310C of FIG. 2A) extending along the edges of the first surface and the second surface and surrounding the internal space of the electronic device 300.

According to an embodiment of the disclosure, the transparent plate 402 may form the first surface of the electronic device 300. The edge of the transparent plate 402 may be connected to the side wall in contact with a portion of the side wall of the housing 401.

According to an embodiment of the disclosure, the display 403 may be disposed between the transparent plate 402 and the vibration actuator 400. The display 403 may be shown to the outside through the transparent plate 402. According to an embodiment of the disclosure, the display 403 may have a second opening 420 formed through the display 403 in a region. The second opening 420 may be defined in various shapes. For example, the second opening 420 may be defined as a circle, a rectangle, or a rectangle with rounded corners.

According to an embodiment of the disclosure, the supporting member 404 may extend into the internal space of the electronic device 300 from the side of the housing 401. The supporting member 404 may be disposed to face the second surface of the housing 401 from the display 403. The supporting member 404 can support electronic parts (e.g., a camera, a printed circuit board, or a vibration actuator 400) disposed in the electronic device 300. According to an embodiment of the disclosure, the supporting member 404 may have a seat space 430 for disposing the vibration actuator 400 in a region. The seat space 430 may be spaced apart from the second opening 420 within a predetermined distance. Referring to FIG. 6A, the seat space 430 may be a region formed through the supporting member 404 to insert the vibration actuator 400. Referring to FIG. 6B, the seat space 430 may be a groove in which a portion of the vibration actuator 400 can be inserted. According to an embodiment of the disclosure, the supporting member 404 may at least partially support the transparent plate 402 and surround the display 403. The supporting member 404 may be spaced apart from the display 403, whereby a gap 406 may be defined. Referring to FIG. 6A, the seat space 430 may be formed through a region of the supporting member

404. The vibration actuator 400 may be at least partially inserted in the seat space 430. The vibration actuator 400 may be disposed in contact with the display 403. The vibration actuator 400 may be at least partially in contact with the supporting member 404 forming the circumference of the seat space 430.

Referring to FIG. 6B, according to an embodiment of the disclosure, the vibration actuator 400 may be spaced apart from the second opening 420 formed in the display 403 and disposed in the seat space 430. The seat space 430 may include a partially thin region of the supporting member 404. The vibration actuator 400 may be seated in the seat space 430 and disposed in contact with the supporting member 404.

According to an embodiment of the disclosure, the vibration actuator 400 can generate vibration in response to an electrical signal including sound information. The vibration generated by the vibration actuator 400 is transmitted to an element (e.g., the supporting member 404, the display 403, or the transparent plate 402) of the electronic device 300, thereby being able to generate a sound signal. For example, the vibration generated by the vibration actuator 400 can be transmitted to the display 403. The display 403 may operate as a diaphragm of a speaker. The vibration generated by the vibration actuator 400 is transmitted to the display 403, thereby being able to generate a sound. The electronic device 300 may include a plurality of vibration actuators 400.

According to an embodiment of the disclosure, in order to adjust the stiffness of the display 403, the electronic device 300 may have the second opening 420 formed in the display 403. The vibration characteristic of the display 403 by the vibration actuator 400 may be adjusted by forming the second opening 420 in the display 403. According to an embodiment of the disclosure, the second opening 430 may overlap a sound adjustment region (e.g., the sound adjustment region 451 of FIG. 3) of the display 403. The sound adjustment region of the display 403 may be a region in which the sound pressure of a sound generated by the vibration actuator 400 is the greatest in the display 403.

Figure 7A:
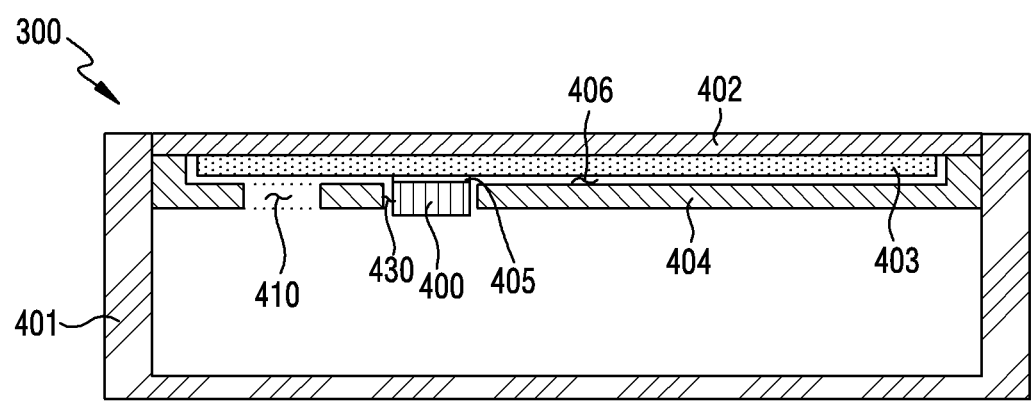
FIG. 7A is a cross-sectional view of an electronic device according to an embodiment of the disclosure.
Figure 7B:
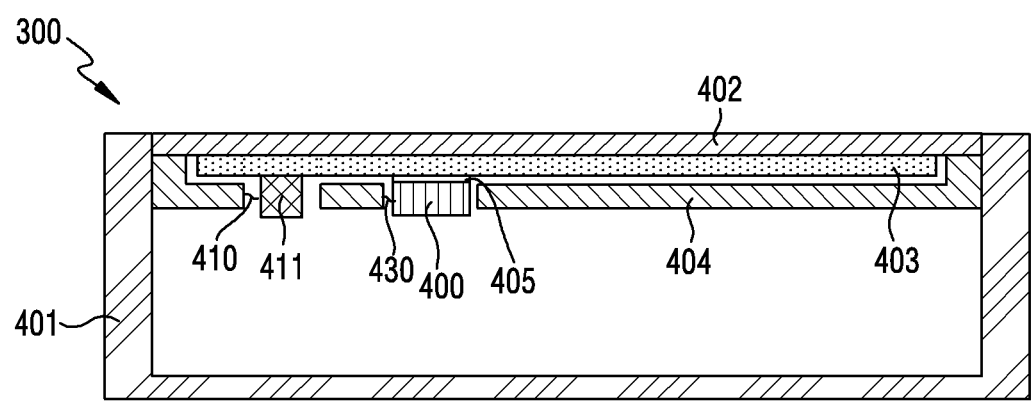
FIG. 7B is a cross-sectional view of an electronic device according to an embodiment of the disclosure.
Figure 7C:
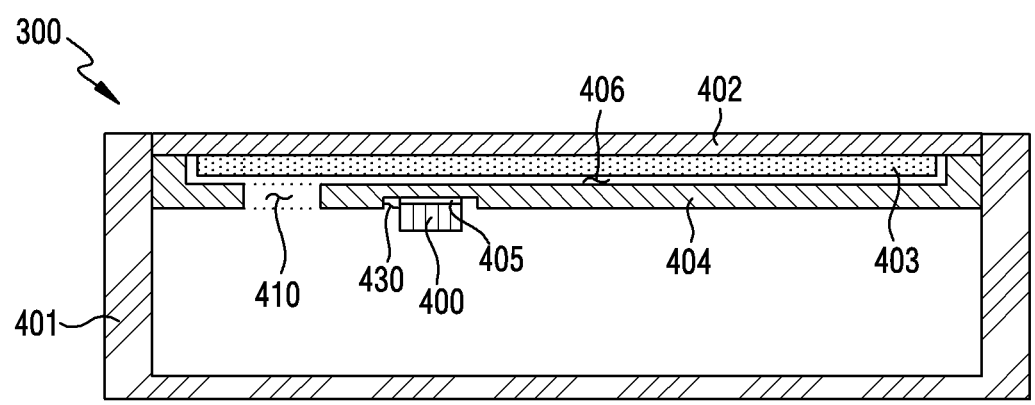
FIG. 7C is a cross-sectional view of an electronic device according to an embodiment of the disclosure.

FIG. 7A is a cross-sectional view of an electronic device according to an embodiment of the disclosure, FIG. 7B is a cross-sectional view of an electronic device according to an embodiment of the disclosure, and FIG. 7C is a cross-sectional view of an electronic device according to an embodiment of the disclosure.

Referring to FIGS. 7A, 7B, and 7C, the electronic device 300 may include a housing 401, a transparent plate 402, a display 403, a supporting member 404, a vibration actuator 400, and an electronic part 411.

According to an embodiment of the disclosure, the housing 401 (e.g., the housing 310 of FIG. 2A) may have a first surface (e.g., the front surface 310A of FIG. 2A) of the electronic device 300, a second surface (e.g., the rear surface 310B of FIG. 2B) of the electronic device 300, and a side (e.g., the side 310C of FIG. 2A) extending along the edges of the first surface and the second surface and surrounding the internal space of the electronic device 300.

According to an embodiment of the disclosure, the transparent plate 402 may form the first surface of the electronic device 300. The transparent plate 402 may be disposed in contact with the display 403.

According to an embodiment of the disclosure, the display 403 may be disposed between the transparent plate 402 and the supporting member 404.

According to an embodiment of the disclosure, the supporting member 404 may extend into the internal space of the electronic device 300 from the side of the housing 401. The supporting member 404 may be disposed between the display 403 and the second surface of the housing 401. According to an embodiment of the disclosure, the supporting member 404 may have a seat space 430 for disposing the vibration actuator 400 in a region. The seat space 430 may be disposed within a predetermined distance from the first opening 410. Referring to FIG. 7A, the seat space 430 may be a region formed through the supporting member 404 to insert the vibration actuator 400. Referring to FIG. 7C, a seat space 430 may be a groove in which a portion of the vibration actuator 400 can be inserted. According to an embodiment of the disclosure, the supporting member 404 may at least partially support the transparent plate 402 and surround the display 403. The supporting member 404 may be spaced apart from the display 403, whereby a gap 406 may be defined.

Referring to FIG. 7A, the seat space 430 may be formed through a region of the supporting member 404. The vibration actuator 400 may be at least partially inserted in the seat space 430. The vibration actuator 400 may be disposed in contact with the display 403. The vibration actuator 400 may be at least partially in contact with the supporting member 404 forming the circumference of the seat space 430.

Referring to FIG. 7C, the vibration actuator 400 may be spaced apart from the first opening 410 formed in the supporting member 404 and disposed in the seat space 430. The seat space 430 may include a partially thin region of the supporting member 404. The seat space 430 may have a groove formed on a surface, which faces the second surface of the housing 401, of the supporting member. The vibration actuator 400 may be seated in the seat space 430 and disposed in contact with the supporting member 404.

According to an embodiment of the disclosure, the vibration actuator 400 can generate vibration in response to an electrical signal including sound information. The vibration generated by the vibration actuator 400 is transmitted to an element (e.g., the supporting member 404, the display 403, or the transparent plate 402) of the electronic device 300, thereby being able to generate a sound signal. For example, the vibration generated by the vibration actuator 400 can be transmitted to the display 403. The display 403 may operate as a diaphragm of a speaker. The vibration generated by the vibration actuator 400 is transmitted to the display 403, thereby being able to generate a sound. The electronic device 300 may include a plurality of vibration actuators 400.

According to an embodiment of the disclosure, in order to adjust the stiffness of the supporting member 404, the electronic device 300 may have the first opening 410 formed in the supporting member 404. The vibration characteristic by the vibration actuator 400 may be adjusted by the first opening 410 of the supporting member 404. The first opening 410 may overlap a sound adjustment region (e.g., the sound adjustment region 451 of FIG. 3) of the display 403. The sound adjustment region of the display 403 may depend on the position of the first opening 410. According to an embodiment of the disclosure, the sound adjustment region of the display 403 may be a region in which the sound pressure of a sound generated by the vibration actuator 400 is the greatest in the display 403.

Referring to FIG. 7B, the electronic device 411 may be disposed in the first opening 410 formed in the supporting member 404. The electronic part 411 may be at least partially inserted in the first opening 410, thereby being able to be in contact with the display 403. According to an embodiment of the disclosure, the vibration characteristic by the vibration actuator 400 may be adjusted by inserting the electronic part 411 into the first opening 410. According to an embodiment of the disclosure, the region in which the first opening 410 having the electronic part 411 inserted therein is positioned may be a region in which the sound pressure of vibration generated by the vibration actuator 400 is the greatest in the display 403.

According to an embodiment of the disclosure, the electronic part 411 may be formed to correspond to the shape of the first opening 410. At least a portion of the electronic part 411 may be in contact with the supporting member 404 forming the circumference of the first opening 410. According to an embodiment of the disclosure, the electronic part 411 may include at least one of an optical input/output device or a sensor module.

Figure 8:
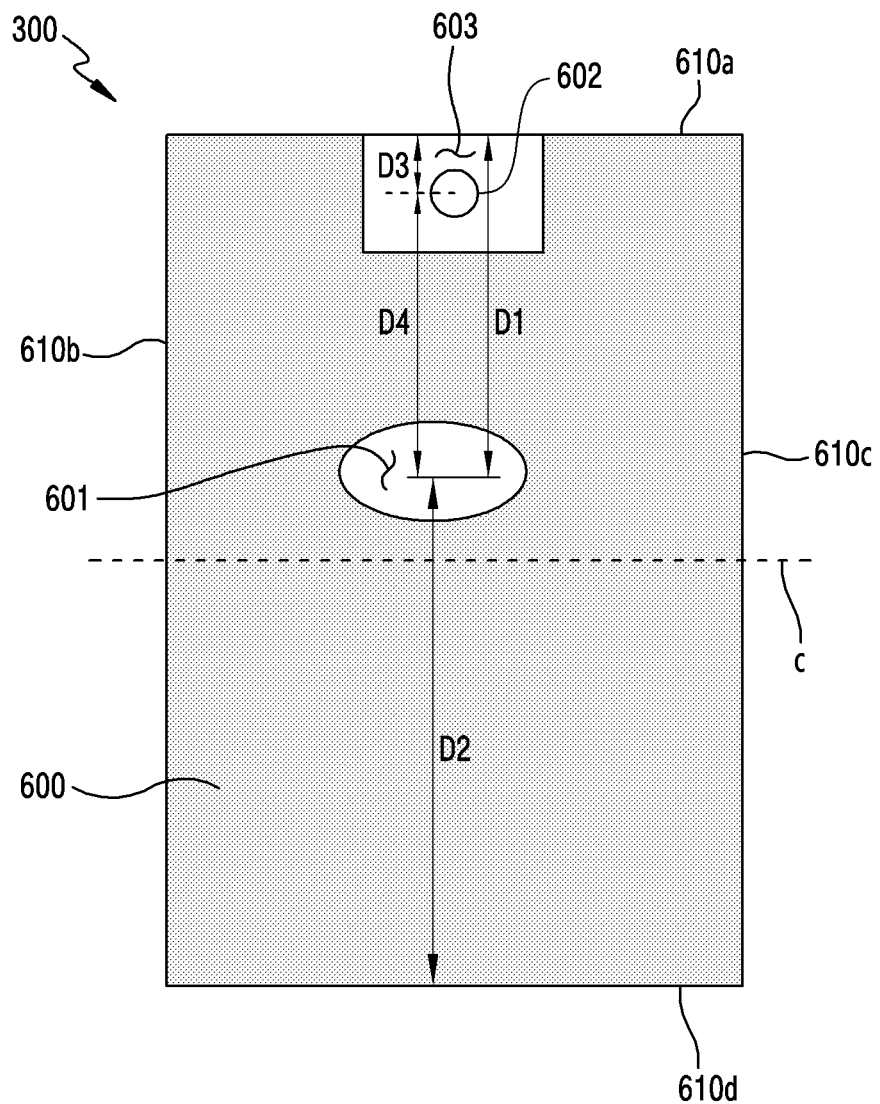
FIG. 8 illustrates positions of a region where a vibration actuator of an electronic device is disposed and a sound adjustment region according to an embodiment of the disclosure.

FIG. 8 illustrates positions of a region where a vibration actuator of an electronic device according to an embodiment is disposed and a sound control region according to an embodiment of the disclosure.

Referring to FIG. 8, the electronic device 300 may include a housing 600 (e.g., the housing 401 of FIG. 4A).

According to an embodiment of the disclosure, the shape of the housing 600 of the electronic device 300 may be substantially similar to the shape of a display (e.g., the display 403 of FIG. 4A) or a supporting member (e.g., the supporting member 404 of FIG. 4A). For example, the housing 600, the supporting member 404, and the display 403 may be different in size and similar in shape or ratio. For example, when the electronic device 300 is seen from the front, the shape of the circumference of each of the housing 600, the supporting member 404, and the display 403 may be a rectangle. FIG. 8 was described based on the housing 600, but it may be applied in a corresponding way to the display 403 and the supporting member 404 having a shape similar to that of the housing 600.

According to an embodiment of the disclosure, the positions of a region 601 in which a vibration actuator is disposed and a sound adjustment region 603 may correspond to the housing 600, the display 403, or the supporting member 404 of the electronic device 300.

According to an embodiment of the disclosure, the housing 600 may have the region 601 in which a vibration actuator (e.g., the vibration actuator 400 of FIG. 4A) is disposed and the sound adjustment region 603 (e.g., the sound adjustment region 451 of FIG. 3).

According to an embodiment of the disclosure, the region 601 in which a vibration actuator is disposed may be a region of the supporting member to which the vibration actuator is attached (e.g., the region to which the vibration actuator 400 of FIG. 4A is attached) or a groove formed in a surface of the supporting member (e.g., the seat space 430 of FIG. 6B). The vibration actuator may be attached to a position corresponding to the region 601 in which the vibration actuator is disposed on the supporting member. As another example, the region 601 in which the vibration actuator is disposed may be a through-hole formed through the supporting member (e.g., the seat space 430 of FIG. 6A). The vibration actuator may be at least partially inserted in the through-hole and attached to a position corresponding to the region 601 for attaching the vibration actuator on the display 403.

According to an embodiment of the disclosure, the sound adjustment region 603 may include a region 602 (e.g., the region 450 of FIG. 3). The region 602 of the sound adjustment region 603 may be a region corresponding to the position of a first region of the housing 600 (e.g., the first region 440 of FIG. 3). For example, the region 602 may be a region corresponding to the position of the through-hole formed through the supporting member 404 (e.g., the first opening 410) or a groove formed in a surface of the supporting member (e.g., the groove 409). As another example, the region 602 may be a region corresponding to the position of a through-hole formed through the display (e.g., the second opening 420).

According to an embodiment of the disclosure, the position of the sound adjustment region 603 may depend on the position of the region 602. For example, the sound adjustment region 603 may include a transmission-reception reference region to which a portion of the body of a user of the electronic device 300 comes close when making a telephone call. The transmission-reception reference region may be a region where an ear of a user of the electronic device 300 is brought in contact with the housing 600. The transmission-reception reference region may be a region in which audio can be transmitted by operation of the vibration actuator when a user makes a telephone call. According to an embodiment of the disclosure, the region 602 in which an opening or a grove is formed may be defined in the sound adjustment region 603. The sound adjustment region 603 having the opening or the groove may be a region in which the sound pressure of a sound generated due to vibration by the vibration actuator is the greatest in the display.

According to an embodiment of the disclosure, there may be a plurality of regions 601 in which the vibration actuator is disposed. The region 601 in which the vibration actuator is disposed may be biased to a first edge 610a from a dotted line 'c' and the region in which an additional vibration actuator is disposed may be biased to a fourth edge 610d from the dotted line 'c'. For example, the region 601 in which the vibration actuator is disposed may be positioned between the dotted line 'c' and the first edge 610a and an additional vibration actuator may be disposed between the dotted line 'c' and the fourth edge 610d.

According to an embodiment of the disclosure, there may be a plurality of sound adjustment regions 603. The sound adjustment region 603 may be positioned close to the first edge 610a and an additional sound adjustment region may be positioned close to the fourth edge 610d. According to an embodiment of the disclosure, the sound adjustment region 603 and the additional sound adjustment region may be operated as stereo speakers. For example, the sound pressure of the sound adjustment region 603 may be increased by the vibration actuator and the sound pressure of an additional sound adjustment region may be increased by an additional vibration actuator. The sound adjustment regions each can transmit an audio signal to the outside using vibration by the increased sound pressure.

According to an embodiment of the disclosure, the housing 600 may have a first edge 610a, a second edge 610b, a third edge 610c, and a fourth edge 610d. The second edge 610b may extend substantially perpendicularly from an end of the first edge 610a. The third edge 610c may be substantially in parallel with the second edge 610b and may extend substantially perpendicularly from the other end of the first edge 610a. The fourth edge 610d may be substantially in parallel with the first edge 610a and may extend from an end of the second edge 610b to an end of the third edge 610c. According to an embodiment of the disclosure, the first edge 610a and the fourth edge 610d may be shorter than the second edge 610b or the third edge 610c.

According to an embodiment of the disclosure, D1 may be the shortest distance between the center of the region 601 in which the vibration actuator is disposed and the first edge 610a. D2 may be the shortest distance between the center of the region 601 in which the vibration actuator is disposed and the fourth edge 610d. D3 may be the shortest distance between the center of the sound adjustment region 603 and the first edge 610a. D4 may be the shortest distance between the center of the region 601 in which the vibration actuator is disposed and the center of the sound adjustment region 603. 'c' may be a dotted line connecting middle points of the first edge 610a and the fourth edge 610d.

According to an embodiment of the disclosure, the distance D1 may be shorter than the distance D2. For example, the region 601 in which the vibration actuator is disposed may be biased to the first edge 610a more than the fourth edge 610d from the dotted line 'c'. According to an embodiment of the disclosure, the distance D3 may be shorter than the distance D1. For example, the center of the sound adjustment region 603 may be positioned within the distance D1 in a direction facing the first edge 610a from the center of the region 601 in which the vibration actuator is disposed. The center of the sound adjustment region 603 may be spaced the distance D3 apart from the first edge 610a and may be spaced the distance D4 apart from the center of the region 601 in which the vibration actuator is disposed.

According to an embodiment of the disclosure, the distance D1 may be determined by the position of the vibration actuator. In the electronic device 300, since various electronic parts (e.g., an antenna module, a camera module, or sensor module) are mounted in a region close to the first edge 610a, the space for disposing the vibration actuator may be insufficient. The distance D1 may be a distance by which the vibration actuator can be spaced apart from the first edge 610a without interfering with the mounting of other electronic parts.

According to an embodiment of the disclosure, the distance D4 may be determined by the position where the sound adjustment region 603 is defined. The sound adjustment region 603 may be a region in which sound pressure can be largest by vibration generated by the vibration actuator. According to an embodiment of the disclosure, the sound adjustment region 603 including the transmission-reception reference region can provide a telephone call sound (or a sound) to a user. According to an embodiment of the disclosure, as the region 602 defined in the sound adjustment region 603 and the region 601 in which the vibration actuator come close to each other, the transmission characteristic of the sound generated from the vibration actuator can be improved.

In an embodiment of the disclosure, the region 602 may be referred to as a stiffness adjustment region 602 because it corresponds to the second opening 420 formed in the display 403 and the first opening 410 or the groove 409 formed in the supporting member 404.

In an embodiment of the disclosure, the region 601 may be referred to as a vibration actuator disposition region 601 because it corresponds to the region in which the vibration actuator 400 is disposed.

Figure 9:
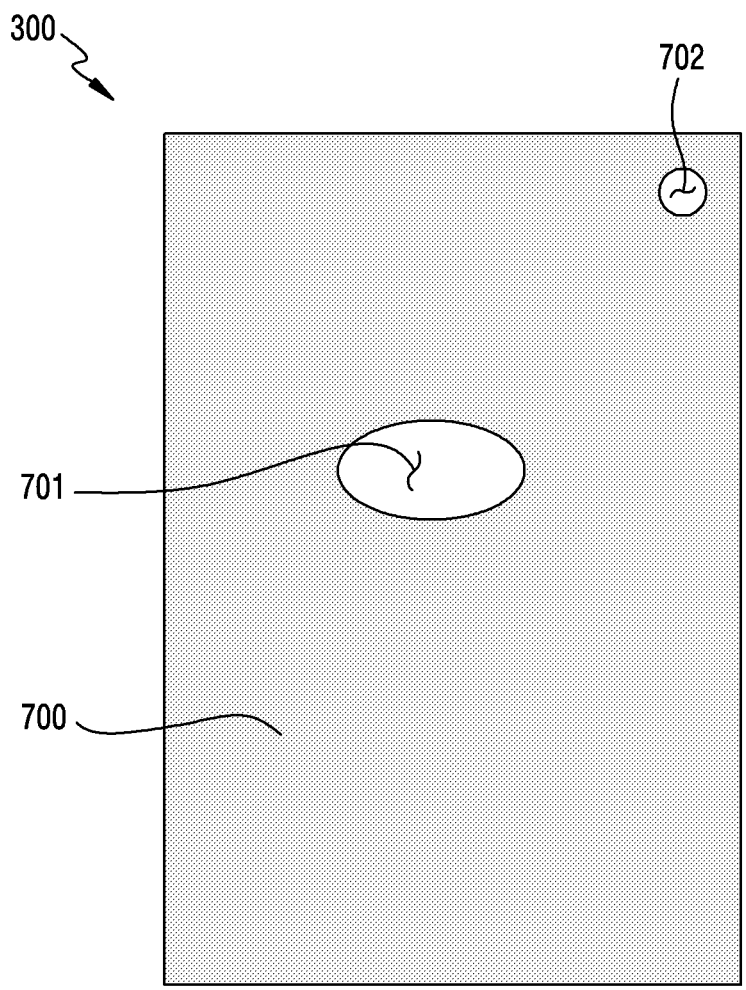
FIG. 9 is a plan view illustrating an electronic device according to an embodiment of the disclosure.

FIG. 9 is a plan view illustrating an electronic device according to an embodiment of the disclosure.

Referring to FIG. 9, the electronic device 300 may include a display 700.

According to an embodiment of the disclosure, the display 700 may have a region 701 in which a vibration actuator (e.g., the vibration actuator 400 of FIG. 4A) is disposed (e.g., the region 601 in which the vibration actuator of FIG. 8 is disposed). For example, the region 701 in which a vibration actuator is disposed may be a region of the supporting member to which the vibration actuator is attached (e.g., the region to which the vibration actuator 400 of FIG. 4A is attached) or a groove formed inn a surface of the supporting member (e.g., the seat space 430 of FIG. 6B). The vibration actuator may be attached to a position corresponding to the region 701 in which the vibration actuator is disposed on a supporting member (e.g., the supporting member 404 of FIG. 3). As another example, the region 701 in which the vibration actuator is disposed may be a through-hole formed through the supporting member (e.g., the seat space 430 of FIG. 6A). The vibration actuator may be at least partially inserted in the through-hole and attached to a position corresponding to the region 701 for attaching the vibration actuator on the display 403.

The display 700 may have an opening 702 formed through the display 700. According to an embodiment of the disclosure, at least a portion of an electronic part (e.g., the electronic part 411 of FIG. 4B) may be inserted in the opening 702. For example, the electronic part may include at least one of an optical input/output device or a sensor module. As another example, in an electronic device 300 having a hole display, the opening 702 formed in the display 700 may correspond to the position of an optical input/output device disposed under the display 700. The opening 702 may be a region in which the electronic device is disposed or may be a passage for light that is transmitted and received by the electronic part.

Figure 10:
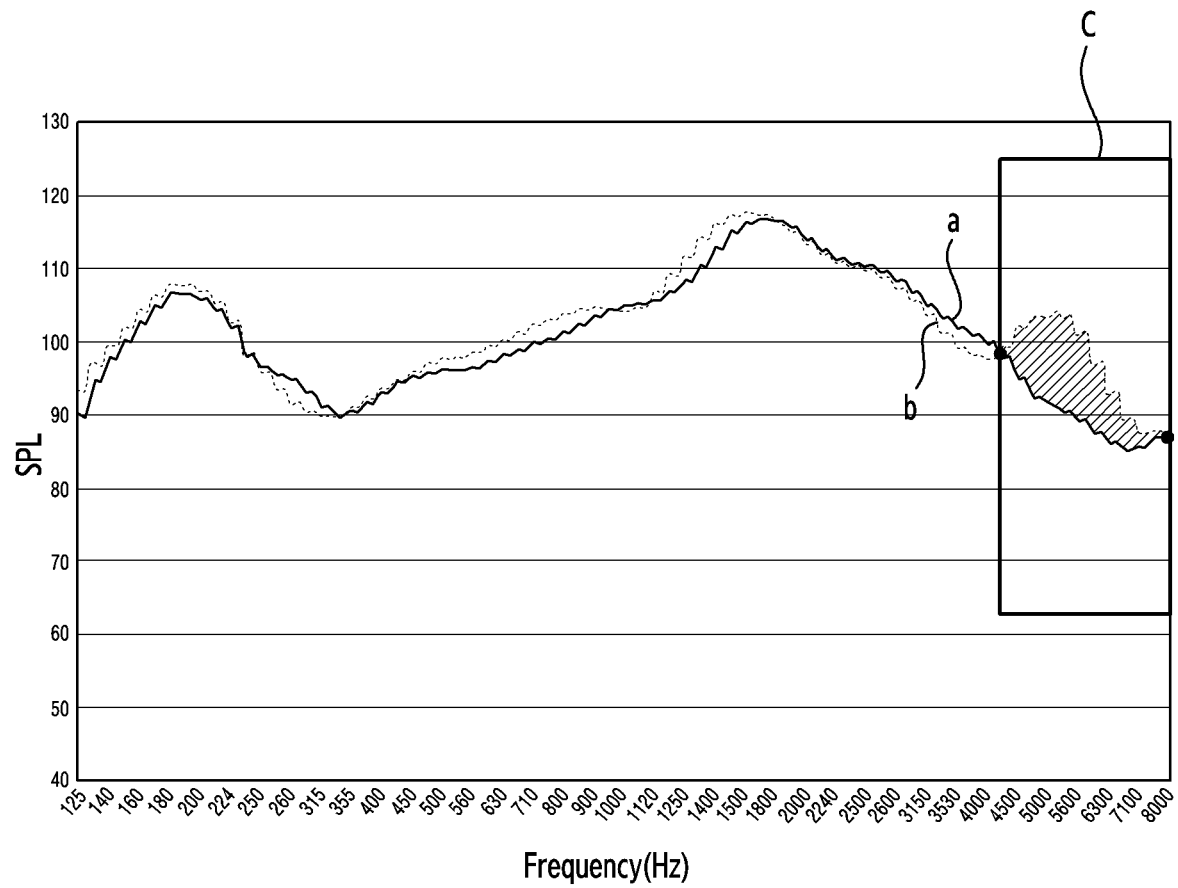
FIG. 10 is a graph illustrating an improvement of sound performance according to an embodiment of the disclosure.

FIG. 10 is a graph illustrating an improvement of sound performance according to an embodiment of the disclosure.

Referring to FIG. 10, the graph 'a' is a graph illustrating the sound performance of an electronic device not having a sound adjustment region (e.g., the sound adjustment region 451 of FIG. 3) and the graph 'b' is a graph illustrating the sound performance of an electronic device (e.g., the electronic device 300 of FIG. 4A) having a sound adjustment region.

According to an embodiment of the disclosure, referring to the graph 'a', sound pressure may drop below the average in the section over about 4500 Hz in the electronic device not having a sound adjustment region, and referring to the graph 'b', sound pressure may be compensated in the section over about 4500 Hz in the electronic device having a sound adjustment region. For example, a sound pressure level may be larger in the section 'c' in the electronic device (b) having a sound adjustment region than in the electronic device (a) not having a sound adjustment region. In the electronic device having a sound adjustment region, it is possible to adjust the vibration of an element by vibration of the vibration actuator by adjusting the stiffness of the element (e.g., the display 403 or the supporting member 404 of FIG. 3) and it is possible to improve the sound performance in the section 'c'. In the electronic device including a sound adjustment region, it is possible to equalize the sound characteristic according to a frequency band by compensating for the sound performance in the section 'c'.

Figure 11:
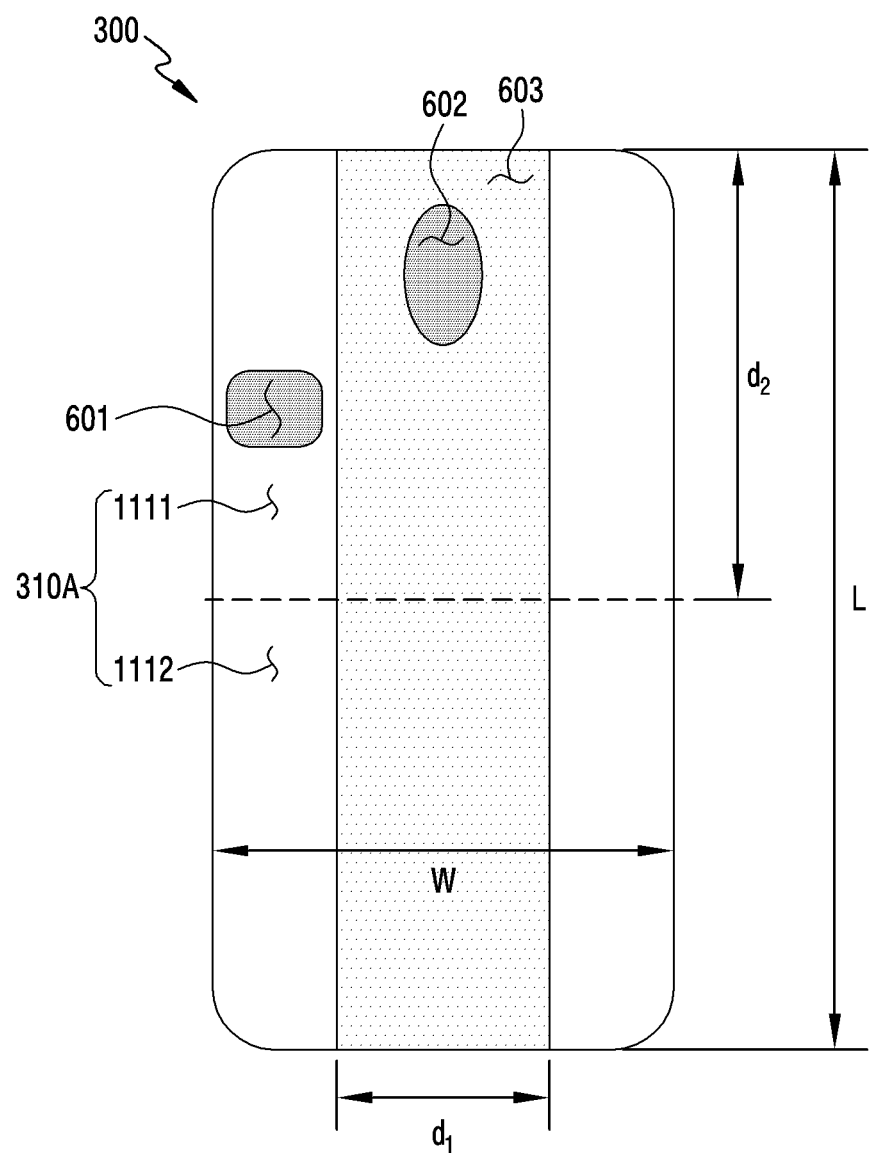
FIG. 11 illustrates an electronic device seen from a front to show a sound adjustment region and a stiffness adjustment region according to an embodiment of the disclosure.

FIG. 11 illustrates an electronic device seen from a front surface to show the positions of the sound adjustment region and a stiffness adjustment region according to an embodiment of the disclosure.

An electronic device 300 according to an embodiment may include at least one or more of the components described with reference to FIGS. 1 to 7C. For example, the electronic device 300 may include the housing 310, the front plate 302, and the display 301 shown in FIGS. 2A and 2B. In FIG. 11, at least one or more of the housing 310, the front plate 302, and the display 301 can be seen through the front surface 310A of the electronic device 300, as shown in FIGS. 2A and 2B, but they are omitted for the convenience of description.

Referring to FIG. 11, the electronic device 300 may have a sound adjustment region 603 and a stiffness adjustment region 602.

The electronic device 300 (or the front surface 310A of the electronic device 300) according to an embodiment may have a width 'w' having a first distance and a length L having a second distance over the first distance.

In an embodiment of the disclosure, the sound adjustment region 603 may have a width $d_1$. The width $d_1$ of the sound adjustment region 603, for example, may be a half (w/2) of the width 'w' of the electronic device 300. In an embodiment of the disclosure, the sound adjustment region 603 may extend in the longitudinal direction L of the electronic device 300. The sound adjustment region 603 may extend from the center portion of the front surface 310A in the longitudinal direction L, as shown in FIG. 11.

In an embodiment of the disclosure, the sound adjustment region 603 may be a region in which performance (e.g., sound pressure) of a sound output from the electronic device 300 is required over a predetermined level. For example, the electronic device 300 can output a sound to the front surface 310A of the electronic device 300 through a vibration actuator and the sound adjustment region 603 may be a region in which the performance of a sound output through the front region 310A is required at a level that is to be higher than other regions.

In an embodiment of the disclosure, the sound adjustment region 603 may include the stiffness adjustment region 602. The stiffness adjustment region 602 may correspond to a region in which the thickness of an element of the electronic device 300 partially differs, in order to improve the performance of the sound output from the electronic device 300. For example, as shown in FIGS. 4A, 4B, 7A, 7B, and 7C, the supporting member 404 of the electronic device 300 may have the first opening 410 and the region in which the first opening 410 is formed in the supporting member 404 may overlap the stiffness adjustment region 602. As another example, as shown in FIG. 4C, the supporting member 404 of the electronic device 300 may have a groove 409 and the groove 409 of the supporting member 404 may overlap the stiffness adjustment region 602. As another example, as shown in FIGS. 5A and 5B, the supporting member 404 of the electronic device 300 may have a first opening 410 and the first opening 410 of the supporting member 404 may overlap the stiffness adjustment region 602. As another example, as shown in FIGS. 5A, 5B, 6A, and 6B, the display 403 of the electronic device 300 may have a second opening 420 and the second opening 420 may overlap the stiffness adjustment region 602.

In an embodiment of the disclosure, the sound adjustment region 603 includes the stiffness adjustment region 602, so the performance of a sound output through the sound adjustment region 603 may be improved more than other regions.

In an embodiment of the disclosure, a vibration actuator disposition region 601 may correspond to the position in which the vibration actuator 400 is disposed in the electronic device 300. For example, as shown in FIGS. 4A to 5B, the vibration actuator 400 may be disposed on a surface of the supporting member 404 (e.g., a surface opposite the transparent plate 402) and the vibration actuator 400 disposed on the supporting member 404 may overlap the vibration actuator disposition region 601. As another example, as shown in FIGS. 6A to 7C, the vibration actuator 400 may be at least partially inserted in the seat space 430 and may be disposed on a surface of the display 403 (e.g., the surface opposite the transparent plate 402) or a surface of the supporting member 404 (e.g., the surface opposite the transparent plate 402), and the vibration actuator 400 disposed on the display 403 or the supporting member 404 may overlap the vibration actuator disposition region 601. In an embodiment of the disclosure, the vibration actuator disposition region 601 may not be included in the sound adjustment region 603, as shown in FIG. 11, and may at least partially overlap the sound adjustment region 603, unlike that shown in the figure.

In an embodiment of the disclosure, the front surface 310A of the electronic device 300 may have a first region 1111 and a second region 1112. The first region 1111 may have a width 'w' and a length $d_2$. The length $d_2$ may be a half (L/2) of the length L of the electronic device 300. The second region 1112 may have a width 'w' and the length of the second region 1112 may be $L-d_2$. For example, the first region 1111 and the second region 1112 may be regions equally dividing the front surface 310A of the electronic device 300 into two parts. Equally separating the first region 1111 and the second region 1112 is an example, and the disclosure is not limited thereto.

In an embodiment of the disclosure, the stiffness adjustment region 602 may be disposed in the first region 1111 or the second region 1112 in the sound adjustment region 603. In an embodiment of the disclosure, as shown in FIG. 11, when the stiffness adjustment region 602 is positioned in the first region 1111, the vibration actuator disposition region 601 may be positioned in the first region 1111. In another embodiment of the disclosure, unlike that shown in the figure, when the stiffness adjustment region 602 is positioned in the second region 1112, the vibration actuator disposition region 601 may be positioned in the second region 1112. The stiffness adjustment region 602 and the vibration actuator disposition region 601 may be positioned in the first region 1111 or the second region 1112. For example, the stiffness adjustment region 602 may be positioned at a position corresponding to the center of the width 'w' of the sound adjustment region 603 of the first region 1111 and the vibration actuator disposition region 601 may be spaced under a third distance, which is half (L/2) of the second distance, apart from the stiffness adjustment region 602. The third distance may depend on the length L and the width 'w' of the electronic device 300. For example, the third distance may be about 50 mm or more and 400 mm or less, but is not limited thereto. In another embodiment of the disclosure, the stiffness adjustment region 602 may overlap not any one of the first region 1111 or the second region 1112, but both of the first region 1111 and the second region 1112 (e.g., the stiffness adjustment region 602 may be positioned at the center in the length direction L in the sound adjustment region 603). However, even in this case, the vibration actuator disposition region 601 may be positioned within half (L/2) of the second distance from the stiffness adjustment region 602.

In an embodiment of the disclosure, the effect of improving the sound performance output from the electronic device 300 may depend on the stiffness adjustment region 602 and the vibration actuator disposition region 601. For example, the smaller the distance between the stiffness adjustment region 602 and the vibration actuator disposition region 601, the more the effect of improving sound performance can increase. In an embodiment of the disclosure, the effect of improving the sound performance output from the electronic device 300 may depend on the frequency of the sound even if the distance of the stiffness adjustment region 602 and the vibration actuator disposition region 601 is uniform. For example, the higher the frequency of the sound output from the electronic device 300, the larger the effect of attenuating the vibration of an element of the electronic device 300 may be and the less the effect of improving sound performance may be. In an embodiment of the disclosure, the effect of improving sound performance output from the electronic device 300 can be increased by positioning the stiffness adjustment region 602 and the vibration actuator disposition region 601 not separately in the first region 1111 and the second region 1112, but together in the first region 1111 or the second region 1112.

Figure 12A:
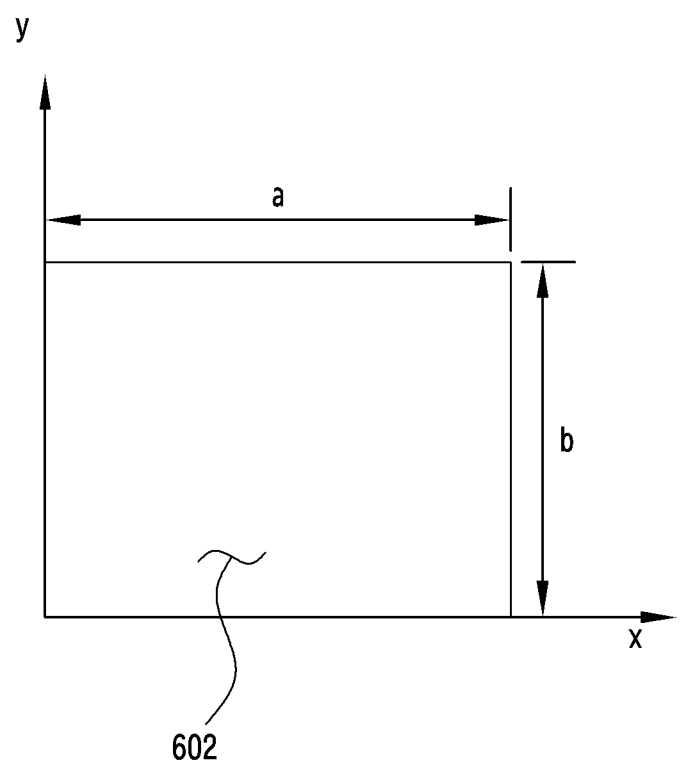
FIG. 12A illustrates a stiffness adjustment region having a rectangular boundary condition according to an embodiment of the disclosure.

FIG. 12A illustrates a stiffness adjustment region having a rectangular boundary condition according to an embodiment of the disclosure.

Figure 12B:
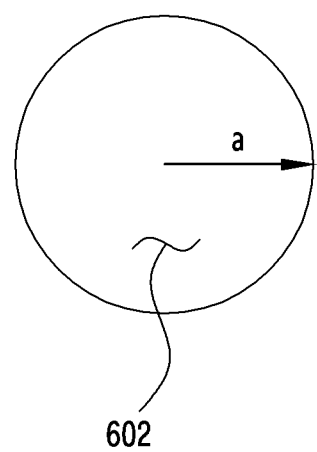
FIG. 12B illustrates a stiffness adjustment region having a circular boundary condition according to an embodiment of the disclosure.

FIG. 12B illustrates a stiffness adjustment region having a circular boundary condition according to an embodiment of the disclosure.

FIGS. 12A and 12B are illustrated based on the stiffness adjustment region 602, but the description referring to FIGS. 12A and 12B may be applied to the first opening 410, the second opening 420, and the groove 409 corresponding to the stiffness adjustment region 602.

Referring to FIG. 12A, a boundary condition of the stiffness adjustment region 602 may be a rectangular having a width 'a' and a length 'b'. In this case, the resonance frequency $\omega_{mn}$ of an element of the electronic device at which vibration by the vibration actuator 400 can be transmitted may be as described by the following Equation 1. In an embodiment of the disclosure, the element may include at least one of the supporting member 404, the display 403, and/or the front plate 402.

$$\omega_{mn} = \sqrt{\frac{D}{\rho h}\left\{\left(\frac{m\pi}{a}\right)^2 + \left(\frac{n\pi}{b}\right)^2\right\}} \qquad \text{Equation 1}$$

In Equation 1, $\omega_{mn}$ is the resonance frequency of the element, D is the stiffness of the element, $\rho$ is the density of the element, h is the thickness of the element, a is the width of the stiffness adjustment region 602 defined on the element, b is the length of the stiffness adjustment region 602 defined on the element, and m and n are variables according to a vibration mode of the element.

The stiffness D of the element can be shown as in the following Equation 2.

$$D = \frac{Eh^3}{12(1-\mu^2)} \qquad \text{Equation 2}$$

In Equation 2, E is Young's modulus of the element and $\mu$ is Poisson's ratio of the element.

When m=1 and n=1, a primary resonance frequency coil of the element can be as described by the following Equation 3.

$$\omega_{11} = \sqrt{\frac{D}{\rho h}\left\{\left(\frac{\pi}{a}\right)^2 + \left(\frac{\pi}{b}\right)^2\right\}} = 2\pi f_r \qquad \text{Equation 3}$$

The resonance frequency $\omega_{11}$ may be determined in accordance with the geometrical parameters of the element, such as a, b, h, $\rho$, and $\mu$.

In an embodiment of the disclosure, the geometrical parameters of the stiffness adjustment region 602 may be determined in accordance with the frequency band of the sound output from the electronic device 300, and the sound performance (e.g., sound pressure and frequency response characteristic) at the frequency band may be improved. For example, assuming that a frequency band at which improvement of sound performance is required is 20 kHz or less that is the audio frequency of humans, the minimum area (e.g., about 100 mm²) of the required sound adjustment region 602 may be determined in accordance with the frequency band.

Referring to FIG. 12B, the boundary condition of the stiffness adjustment region 602 may be a circle having a radius 'a'. In this case, the resonance frequency $\omega_{mn}$ of an element of the electronic device at which vibration by the vibration actuator 400 can be transmitted may be as described by the following Equation 4.

$$\omega_{mn} = \frac{\alpha_{mn}^2 h}{2a^2}\sqrt{\frac{E}{3(1-\mu^2)\rho}} = 2\pi f_r \qquad \text{Equation 4}$$

In Equation 4, $\omega_{mn}$ is the resonance frequency of the element, a is the radius of the stiffness adjustment region 602 defined on the element, h is the thickness of the element, $\rho$ is the density of the element, E is a Young's modulus of the element, $\mu$ is a Poisson's ratio of the element, m and n are variables according to a variation mode of the element, and $\alpha_{mn}$ is an eigen value according to the boundary condition.

When m=0 and n=1, Equation 4 may be expressed with respect to the radius 'a' of the stiffness adjustment region 602 as the following Equation 5.

$$a^2 = \frac{\alpha_{01}^2 h}{4\pi f_r}\sqrt{\frac{E}{3(1-\mu^2)\rho}} \qquad \text{Equation 5}$$

Referring to Equation 5, the radius 'a' of the stiffness adjustment region 602 may be determined in accordance with the frequency $f_r$ at which sound performance is intended to be improved. For example, assuming that a frequency band in which improvement of sound performance is required is 20 kHz or less that is the audio frequency of humans, the minimum radius of the required sound adjustment region 602 may be determined in accordance with the frequency band. For example, $f_r$ may be 20000 Hz. $\alpha_{01}$ for determining the primary resonance frequency $\omega_{01}$ may depend on the boundary condition, but may be about 3.1962 under a clamped condition. In this case, the radius 'a' of the stiffness adjustment region 602 may be determined based on the other parameters h, $\rho$, $\mu$, and E except for the radius 'a' of the element. Since as the frequency $f_r$ decreases, the radius 'a' may increase, the determined radius 'a' of the stiffness adjustment region 602 may be the minimum radius required for improving the sound performance in a frequency band under 20 kHz. The area of the stiffness adjustment region 602 may be determined based on the radius 'a'. In an embodiment of the disclosure, the required minimum area (e.g., 100 mm²) of the stiffness adjustment region 602 may be determined in accordance with the frequency band (e.g., under 20 kHz) in which the improvement of the sound performance is required. As another example, assuming that the frequency band in which the improvement of the sound performance is required is about 2 kHz or more and 20 kHz or less, the required area of the stiffness adjustment region 602 may be about 100 mm$^2$ or more and 4000 mm$^2$ or less.

An electronic device (e.g., the electronic device 300) according to an embodiment described above includes: a housing (e.g., the housing 404 of FIG. 3) having a first surface (e.g., the first surface 310A of FIG. 2A) facing a first direction, a second surface (e.g., the second surface 310B of FIG. 2B) facing a second direction opposite to the first direction, and a side (e.g., the side 310C of FIG. 2A) defining an internal space by extending along edges of the first surface and the second surface; a supporting member (e.g., the supporting member 404 of FIG. 3) extending from a side of the housing, disposed in the internal space, and having a first region (e.g., the first region 440 of FIG. 3) at least partially cut off; a display (e.g., the display 403 of FIG. 3) disposed on the supporting member and having a sound adjustment region (e.g., the sound adjustment region 451 of FIG. 3); and a vibration actuator (e.g., the vibration actuator 400 of FIG. 3) disposed between the display and the second surface and disposed within a predetermined distance from the first region, in which the first region may overlap the sound adjustment region when the electronic device is seen from above.

According to an embodiment of the disclosure, the sound adjustment region may be a region in which a portion of the body comes in contact with the display when a user makes a telephone call.

According to an embodiment of the disclosure, the first region may have a hole (the first opening 410 of FIG. 4A) formed through the supporting member or a groove (e.g., the groove 409 of FIG. 4A) formed in a surface of the supporting member.

According to an embodiment of the disclosure, the supporting member may be disposed between the vibration actuator and the display and the vibration actuator may be in contact with the supporting member.

According to an embodiment of the disclosure, the display may have a hole (e.g., the second opening 420 of FIG. 5A) formed through the display and the hole may overlap the first region.

The electronic device according to an embodiment may further include an electronic part (e.g., the electronic part 411 of FIG. 4B) at least partially inserted in the first region or the hole.

The electronic device according to an embodiment may further include an additional vibration actuator spaced apart from the vibration actuator and the supporting member may be disposed within a predetermined distance from the additional vibration actuator and may have a second region (e.g., the region 601 in which the vibration actuator is disposed of FIG. 8) at least partially cut off.

According to an embodiment of the disclosure, the supporting member may have a seat space (e.g., the region 601 in which the vibration actuator is disposed of FIG. 8) in which the vibration actuator is seated, the seat space is a groove (e.g., the seat space 430 of FIG. 6B) formed on a surface of the supporting member that faces a second surface of the housing, and the vibration actuator may be in contact with the supporting member.

According to an embodiment of the disclosure, the supporting member may have a seat space in which the vibration actuator is seated, the seat space is a hole (e.g., the seat space 430 of FIG. 7A) formed through the supporting member, and the vibration actuator may be in contact with the display.

According to an embodiment of the disclosure, the housing is formed in a rectangular shape and has a first edge (e.g., the first edge 610a of FIG. 8), a second edge (e.g., the second edge 610b of FIG. 8) longer than the first edge and substantially perpendicularly extending from an end of the first edge, a third edge (e.g., the third edge 610c of FIG. 8) being in parallel with the second edge and extending from the other end of the first edge, and a fourth edge (e.g., the fourth edge 610d of FIG. 8) being in parallel with the first edge and extending from an end of the second edge to an end of the third edge, and the distance from the vibration actuator to the first edge may be shorter than the distance from the vibration actuator to the fourth edge.

According to an embodiment of the disclosure, the sound adjustment region is positioned between the first edge and the vibration actuator in the electronic device.

According to an embodiment of the disclosure, the sound pressure of sound generated by the vibration actuator may be largest in the sound adjustment region in the display.

An electronic device (e.g., the electronic device 300 of FIG. 3) according to an embodiment described above includes: a housing (e.g., the housing 310 of FIG. 2A) having a first surface (e.g., the first surface 310A of FIG. 2A) facing a first direction, a second surface (e.g., the second surface 310B of FIG. 2B) facing a second direction opposite to the first direction, and a side (e.g., the side 310C of FIG. 2B) defining an internal space by extending along edges of the first surface and the second surface; a supporting member (e.g., the supporting member 404 of FIG. 3) extending from a side of the housing, disposed in the internal space, and having a first region (e.g., the first region 440 of FIG. 3) at least partially cut off and a seat space (e.g., the region 601 in which the vibration actuator is disposed of FIG. 8) formed within a predetermined distance from the first region; a display (e.g., the display 403 of FIG. 3) disposed between the supporting member and the first surface and having a sound adjustment region (e.g., the sound adjustment region 451 of FIG. 3); and a vibration actuator (e.g., the vibration actuator 400 of FIG. 3) at least partially inserted in the seat space and being in contact with the display, in which the first region may be a hole (e.g., the first opening 410 of FIG. 4A) formed through the supporting member or a groove (the groove 409 of FIG. 4A) formed in the supporting member, may be positioned between an edge of the housing that is close to the sound adjustment region and the seat space, and may overlap the sound adjustment region when the electronic device is seen from above.

According to an embodiment of the disclosure, the sound adjustment region may be a region in which a portion of the body comes in contact with the display when a user makes a telephone call.

According to an embodiment of the disclosure, the housing is formed in a rectangular shape and has a first edge (e.g., the first edge 610a of FIG. 8), a second edge (e.g., the second edge 610b of FIG. 8) longer than the first edge and substantially perpendicularly extending from an end of the first edge, a third edge (e.g., the third edge 610c of FIG. 8) being in parallel with the second edge and extending from the other end of the first edge, and a fourth edge (e.g., the fourth edge 610d of FIG. 8) being in parallel with the first edge and extending from an end of the second edge to an end of the third edge, and the distance from the seat space to the first edge may be shorter than the distance from the seat space to the fourth edge.

According to an embodiment of the disclosure, the sound adjustment region may be positioned between the first edge and the seat space.

According to an embodiment of the disclosure, the sound pressure of sound generated by the vibration actuator may be largest in the sound adjustment region in the display.

The electronic device according to an embodiment may further include an additional vibration actuator disposed between the seat space and the fourth edge, and the display may have an additional sound adjustment region positioned between the fourth edge and the additional vibration actuator.

An electronic device according to an embodiment includes: a housing (e.g., the housing 401 of FIG. 6A) having a first edge (e.g., the first edge 610a of FIG. 8), a second edge (e.g., the second edge 610b of FIG. 8) longer than the first edge and substantially perpendicularly extending from an end of the first edge, a third edge (e.g., the third edge 610c of FIG. 8) being in parallel with the second edge and extending from the other end of the first edge, and a fourth edge (e.g., the fourth edge 610d of FIG. 8) being in parallel with the first edge and extending from an end of the second edge to an end of the third edge; a transparent plate (e.g., the transparent plate 402 of FIG. 6A) forming a surface of the housing; a supporting member (e.g., the supporting member 404 of FIG. 6A) extending from a side of the housing, disposed in the internal space, and having a seat space (e.g., the seat space 430 of FIG. 6A) defined in a region; a display disposed between the supporting member and the transparent plate and having an opening (e.g., the second opening 420 of FIG. 6A) spaced a predetermined distance apart from the seat space; and a vibration actuator (e.g., the vibration actuator 400 of FIG. 6A) at least partially inserted in the seat space and disposed in contact with the display, in which the seat space is formed through the supporting member, the distance from the seat space to the first edge is shorter than the distance to the fourth edge, and the opening may be disposed between the seat space and the first edge.

The electronic device according to an embodiment may further include an electronic part (e.g., the electronic part 411 of FIG. 5B) at least partially inserted in the opening.

A mobile communication device (e.g., the electronic device 300 of FIG. 3) according to an embodiment includes: a display (e.g., the display 403 of FIG. 3), a supporting member (e.g., the supporting member 404 of FIG. 3) disposed under the display-a hole (e.g., the first opening 410 of FIG. 4A) being formed in the supporting member; and a vibration actuator (e.g., the vibration actuator 400 of FIG. 3) attached to the supporting member, in which the vibration actuator does not overlap the hole when seen substantially perpendicularly to the display and at least a portion of a region surrounding the hole of the supporting member is vibrated by vibration generated from the vibration actuator, whereby a sound signal having a predetermined frequency to be used for voice communication is generated.

In an embodiment of the disclosure, the predetermined frequency may be about 4.5 kHz or more and 8 kHz or less.

In an embodiment of the disclosure, the display may have another hole (e.g., the second opening 420 of FIG. 5A) aligned with the hole.

In an embodiment of the disclosure, at least a portion of the other hole may overlap the hole.

The mobile communication device according to an embodiment may include an image detection module (e.g., the electronic part 411 of FIG. 5B) positioned through the hole and the other hole.

In an embodiment of the disclosure, the area of the hole may be about 100 mm² or more and 4000 mm² or less.

In an embodiment of the disclosure, the display may have a width of a first distance and a length of a second distance over the first distance, and the vibration actuator may be spaced a third distance, which is a half of the second distance or less, apart from the hole.

In an embodiment of the disclosure, the third distance may be about 50 mm or more and 400 mm or less.

In an embodiment of the disclosure, the hole may be formed substantially at the center of the supporting member in a width-directional cross-section of the mobile communication device.

The mobile communication device according to an embodiment may include a printed circuit board disposed under the supporting member, the printed circuit board may have an opening, and at least a portion of the vibration actuator may be positioned in the opening.

The mobile communication device according to an embodiment may include a flexible PCB electrically connected with the vibration actuator and the flexible PCB may be electrically connected with the printed circuit board.

In an embodiment of the disclosure, the vibration actuator may include a motor or a piezoelectric.

In an embodiment of the disclosure, the supporting member may include at least one of an embossed layer, a cushion layer, a conductive layer, and a bracket.

An electronic device (e.g., the electronic device 300 of FIG. 3) according to an embodiment described above includes: a housing (e.g., the housing 310 of FIG. 2A) having a first surface (e.g., the front surface 310A of FIG. 2A) facing a first direction, a second surface (e.g., the rear surface 310B of FIG. 2A) facing a second direction opposite to the first direction, and a side (e.g., the side 310C of FIG. 2A) defining an internal space by extending along edges of the first surface and the second surface; a supporting member (e.g., the supporting member 404 of FIG. 3) extending from a side of the housing, disposed in the internal space, and having a first region (e.g., the first region 440 of FIG. 3) at least partially cut off; a display (e.g., the display 403 of FIG. 3) disposed on the supporting member; and a vibration actuator (e.g., the vibration actuator 400 of FIG. 3) disposed between the display and the second surface and disposed within a predetermined distance from the first region, in which the portion including the first region is at least partially vibrated by the vibration generated from the vibration actuator, whereby a sound signal having a predetermined frequency to be used for voice communication is generated.

In an embodiment of the disclosure, the first region may have a groove (the groove 409 of FIG. 4C) formed in a surface of the supporting member.

In an embodiment of the disclosure, the supporting member may be disposed between the vibration actuator and the display and the vibration actuator may be in contact with the supporting member.

In an embodiment of the disclosure, the first region may have a first hole (e.g., the first opening 410 of FIG. 4A) formed through the supporting member, the display may have a second hole (e.g., the second opening 420 of FIG. 5A) formed through the display, and the second hole may overlap the first region.

The electronic device according to an embodiment of the disclosure may further include an electronic part (e.g., the electronic part 411 of FIG. 5B) at least partially inserted in the first hole and the second hole.

In an embodiment of the disclosure, the supporting member may have a seat space (e.g., the seat space 430 of FIG. 6B) in which the vibration actuator is seated, the seat space is a groove formed on a surface of the supporting member that faces the second surface of the housing, and the vibration actuator may be in contact with the supporting member.

In an embodiment of the disclosure, the supporting member may have a seat space (e.g., the seat space 430 of FIG. 6A) in which the vibration actuator is seated, the seat space is a hole formed through the supporting member, and the vibration actuator may be in contact with the display.

Further, either multiple elements expressed in the description may be configured into a single element or a single element in the description may be configured into multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A mobile communication device comprising:
   a display;
   a supporting member disposed under the display, the supporting member including a first hole; and
   a vibration actuator attached to the supporting member,
   wherein the vibration actuator does not overlap the first hole when viewed in a direction substantially perpendicular to the display,
   wherein at least a portion of a region surrounding the first hole of the supporting member is vibrated by vibration generated from the vibration actuator, whereby a sound signal having a predetermined frequency to be used for voice communication is generated, and
   wherein the first hole overlaps a portion of a first area of the display when viewed in a direction substantially perpendicular to the display, the first area being located adjacent to a center of a first edge of the mobile communication device.

2. The mobile communication device of claim 1, wherein the predetermined frequency is 4.5 kHz or more and 8 kHz or less.

3. The mobile communication device of claim 1, wherein the display includes a second hole aligned with the first hole.

4. The mobile communication device of claim 3, wherein at least a portion of the second hole overlaps the first hole.

5. The mobile communication device of claim 4, comprising an image detection module positioned through the first hole and the second hole.

6. The mobile communication device of claim 1, wherein an area of the first hole includes 100 $mm^2$ or more and 4000 $mm^2$ or less.

7. The mobile communication device of claim 1,
   wherein the display includes a width of a first distance and a length of a second distance over the first distance, and
   wherein the vibration actuator is spaced a third distance, which is a half of the second distance or less, apart from the first hole.

8. The mobile communication device of claim 7, wherein the third distance includes 50 mm or more and 400 mm or less.

9. The mobile communication device of claim 1, wherein the first hole is formed substantially at a center of the supporting member in a width-directional cross-section of the mobile communication device.

10. The mobile communication device of claim 1, further comprising:
    a printed circuit board disposed under the supporting member,
    wherein the printed circuit board includes an opening, and
    wherein at least a portion of the vibration actuator is positioned in the opening.

11. The mobile communication device of claim 10, comprising:
    wherein a flexible PCB electrically connected with the vibration actuator, and
    wherein the flexible PCB is electrically connected with the printed circuit board.

12. The mobile communication device of claim 1, wherein the vibration actuator includes a motor or a piezoelectric.

13. The mobile communication device of claim 1, wherein the supporting member includes at least one of an embossed layer, a cushion layer, a conductive layer, or a bracket.

14. An electronic device comprising:
    a housing including:
       a first surface facing a first direction,
       a second surface facing a second direction opposite to the first direction, and
       a side defining an internal space by extending along edges of the first surface and the second surface;
    a supporting member extending from a side of the housing, disposed in the internal space, and including a first region at least partially cut off;
    a display disposed on the supporting member; and
    a vibration actuator disposed between the display and the second surface and disposed within a predetermined distance from the first region,
    wherein a portion having the first region of the supporting member is at least partially vibrated by vibration generated from the vibration actuator, whereby a sound signal having a predetermined frequency to be used for voice communication is generated, and
    wherein the first region overlaps a portion of a first area of the display when viewed in a direction substantially perpendicular to the display, the first area being located adjacent to a center of a first edge of the electronic device.

15. The electronic device of claim 14, wherein the first region includes a groove formed in a surface of the supporting member.

16. The electronic device of claim 15,
    wherein the supporting member is disposed between the vibration actuator and the display, and
    wherein the vibration actuator is in contact with the supporting member.

17. The electronic device of claim 15, wherein a vibration characteristic of the supporting member is adjusted through the groove.

18. The electronic device of claim 14,
    wherein the first region of the supporting member includes a first hole penetrating the supporting member,
    wherein the display includes a second hole penetrating the display, and
    wherein the second hole overlaps the first region.

19. The electronic device of claim 18, further comprising an electronic part at least partially inserted in the first hole and the second hole.

20. The electronic device of claim 18, wherein the first region includes a region where a stiffness of the supporting member is adjusted.

21. The electronic device of claim 14,
    wherein the supporting member includes a seat space in which the vibration actuator is seated, wherein the seat space includes a groove formed in a surface of the supporting member that faces the second surface of the housing, and wherein the vibration actuator is in contact with the supporting member.

22. The electronic device of claim 14, wherein the supporting member includes a seat space in which the vibration actuator is accommodated, wherein the seat space is a hole penetrating the supporting member, and wherein the vibration actuator is in contact with the display.

* * * * *